US009644717B2

(12) United States Patent
Aitcin

(10) Patent No.: US 9,644,717 B2
(45) Date of Patent: May 9, 2017

(54) CONTINUOUSLY VARIABLE TRANSMISSION DRIVING PULLEY

(75) Inventor: Xavier-Pierre Aitcin, St. Hyacinthe (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 414 days.

(21) Appl. No.: 14/005,787

(22) PCT Filed: Mar. 22, 2012

(86) PCT No.: PCT/US2012/030145
§ 371 (c)(1),
(2), (4) Date: Sep. 17, 2013

(87) PCT Pub. No.: WO2012/129417
PCT Pub. Date: Sep. 27, 2012

(65) Prior Publication Data
US 2014/0004984 A1    Jan. 2, 2014

Related U.S. Application Data

(60) Provisional application No. 61/466,287, filed on Mar. 22, 2011.

(51) Int. Cl.
*F16H 9/12* (2006.01)
*F16H 55/56* (2006.01)
*F16H 63/06* (2006.01)

(52) U.S. Cl.
CPC .......... *F16H 9/125* (2013.01); *F16H 55/56* (2013.01); *F16H 55/563* (2013.01); *F16H 63/067* (2013.01)

(58) Field of Classification Search
CPC ... F16H 9/00; F16H 9/08; F16H 9/125; F16H 9/16; F16H 9/20; F16H 55/00;
(Continued)

(56) References Cited

U.S. PATENT DOCUMENTS 3,605,510 A * 9/1971 Laughlin .......... F16H 61/66245
474/14
3,605,511 A * 9/1971 Deschene .......... F16H 1/66245
474/14
(Continued)

FOREIGN PATENT DOCUMENTS

EP    1171729 B1    11/2002
EP    1420195 B1    6/2008
(Continued)

OTHER PUBLICATIONS

Nook Industries Inc., Ball Spine Products, retrieve from http://www.nookindustries.com/Product/ProductLine/Ball-Spline-Products on Nov. 11, 2014, Cleveland, USA.
(Continued)

*Primary Examiner* — William E Dondero
*Assistant Examiner* — Juan Campos, Jr.
(74) *Attorney, Agent, or Firm* — BCF LLP

(57) ABSTRACT

A centrifugally actuated driving pulley for a continuously variable transmission (CVT) has a movable sheave that is connected to the fixed sheave via a ball spline assembly. Also disclosed is a driving pulley for a CVT having a movable sheave that is connected to the fixed sheave via a ball spline assembly, where at least some of the outer grooves receiving the ball bearings of the ball spline assembly are angularly offset from at least some of the corresponding inner grooves receiving the ball bearings of the ball spline assembly. Also disclosed is a driving pulley for a CVT having a movable sheave that is connected to the fixed sheave via a ball spline assembly, where at least some of the outer and inner grooves receiving the ball bearings of the ball spline assembly have a generally ogival cross-section. A CVT and a vehicle having a CVT are also disclosed.

25 Claims, 19 Drawing Sheets

(58) Field of Classification Search
CPC .......... F16H 55/32; F16H 55/36; F16H 55/49;
F16H 55/52; F16H 55/56; F16H 55/563;
F16H 63/03; F16H 63/063; F16H 63/30
USPC .................. 474/8, 13, 14, 17, 19, 43, 46
See application file for complete search history.

(56) References Cited

U.S. PATENT DOCUMENTS

| | | | |
|---|---|---|---|
| 3,777,583 A * | 12/1973 | Talbot | .................. F16H 55/563 |
| | | | 474/14 |
| 5,052,981 A | 10/1991 | Robert | |
| 5,108,347 A | 4/1992 | Gourdon | |
| 5,188,568 A | 2/1993 | Gourdon | |
| 5,269,726 A | 12/1993 | Swanson et al. | |
| 5,328,413 A | 7/1994 | Robert | |
| 5,358,450 A | 10/1994 | Robert | |
| 5,421,784 A | 6/1995 | Robert | |
| 5,514,040 A | 5/1996 | Robert | |
| 5,516,332 A | 5/1996 | Robert | |
| 5,529,544 A | 6/1996 | Berto | |
| 5,597,060 A | 1/1997 | Huddleston | |
| 5,647,810 A | 7/1997 | Huddleston | |
| 5,797,816 A | 8/1998 | Bostelmann | |
| 5,803,846 A | 9/1998 | Yamada et al. | |
| 5,941,787 A | 8/1999 | Imaida et al. | |
| 6,071,210 A | 6/2000 | Kato et al. | |
| 6,149,540 A | 11/2000 | Johnson et al. | |
| 6,379,274 B1 | 4/2002 | Robert | |
| 6,520,878 B1 | 2/2003 | Leclair et al. | |
| 6,565,465 B2 | 5/2003 | Nishigaya et al. | |
| 6,682,450 B2 | 1/2004 | Mukai et al. | |
| 7,044,872 B1 | 5/2006 | Johnson | |
| 7,063,633 B2 | 6/2006 | Robert | |
| 7,090,600 B2 | 8/2006 | Lohr | |
| 7,163,477 B1 | 1/2007 | Sherrod | |
| 7,172,523 B2 | 2/2007 | Borghi | |
| 7,276,004 B2 | 10/2007 | Wu et al. | |
| 7,313,977 B2 | 1/2008 | Borghi | |
| 7,338,398 B2 | 3/2008 | Whiting et al. | |
| 7,726,927 B2 | 6/2010 | Cook | |
| 2002/0026928 A1 * | 3/2002 | Korenjak | ............... F01M 11/02 |
| | | | 123/572 |
| 2002/0032088 A1 * | 3/2002 | Korenjak | .................. F01B 1/12 |
| | | | 474/14 |
| 2002/0033295 A1 * | 3/2002 | Korenjak | .................. F01B 1/12 |
| | | | 180/292 |
| 2002/0123400 A1 | 9/2002 | Younggren et al. | |
| 2002/0142870 A1 | 10/2002 | Okano et al. | |
| 2003/0221890 A1 * | 12/2003 | Fecteau | ...................... B62J 1/12 |
| | | | 180/210 |
| 2005/0233844 A1 | 10/2005 | Kuroda | |
| 2007/0295550 A1 | 12/2007 | Oishi et al. | |
| 2008/0047772 A1 | 2/2008 | Ishida | |
| 2008/0190673 A1 * | 8/2008 | Sugitani | .................... F16H 9/18 |
| | | | 180/54.1 |
| 2009/0111623 A1 | 4/2009 | Galletti et al. | |
| 2009/0116770 A1 | 5/2009 | Watanabe et al. | |
| 2009/0156338 A1 | 6/2009 | Galletti et al. | |
| 2009/0227404 A1 | 9/2009 | Beyer | |

FOREIGN PATENT DOCUMENTS

| | | |
|---|---|---|
| EP | 1967768 A2 | 9/2008 |
| EP | 1895193 B1 | 12/2009 |
| JP | 5940061 | 3/1984 |
| WO | 2010085868 A1 | 8/2010 |

OTHER PUBLICATIONS

Naoki Yamaguchi, Demystifying Ball Spline Specs, NB Corporation of America, Jan. 11, 2011, Illinois, USA.
English Abstract of JPS5940061, Published Mar. 5, 1984; Retrieved from http://worldwide.espacenet.com/ on Sep. 11, 2013.

* cited by examiner

CONTINUOUSLY VARIABLE TRANSMISSION DRIVING PULLEY

CROSS-REFERENCE

The present application claims priority from U.S. Provisional Patent Application No. 61/466,287, filed Mar. 22, 2011, the entirety of which is incorporated herein by reference.

TECHNICAL FIELD

The present invention relates to driving pulleys for continuously variable transmissions.

BACKGROUND

Conventional snowmobile drive trains incorporate a continuously variable transmission (CVT) having a driving pulley that is operatively coupled to the engine crankshaft and a driven pulley coupled to a driven shaft. The driving pulley transfers torque to the driven pulley via a drive belt looped around both pulleys. The driving pulley includes a centrifugal actuation system through which the drive ratio of the CVT is varied progressively as a function of the engine speed and the output torque at the driven pulley. Typically, the driven shaft is a transverse jackshaft which drives the input member of a chain and sprocket reduction drive. The output of reduction drive is coupled to one end of the axle on which are located the drive track drive sprocket wheels.

The driving pulley includes a fixed sheave and a movable sheave that rotate together. The fixed sheave is axially fixed. The movable sheave is movable axially toward or away from the fixed sheave in response to actuation by the centrifugal actuation system and a biasing spring. To maintain the movable sheave rotationally fixed relative to the fixed sheave while permitting axial movement of the movable sheave relative to the fixed sheave, the movable and fixed sheave are usually connected to each other via a sliding mechanism including plastic sliders.

Although this kind of connection achieves the desired type of connection between the fixed and movable sheaves, the use of this type of sliding mechanism creates a significant amount of friction and stiction between the fixed and movable sheave. This limits the responsiveness of the driving pulley to changes in engine speed and/or torque at the driven pulley.

Therefore there is a need for a way of connecting the fixed and movable sheaves together that reduces the amount of friction and stiction hindering the axial movement of the movable sheave relative to the fixed sheave.

However, one advantage of using splines is that splines can be designed to have little backlash. Backlash is the amount of play (or lost motion) between the internal and external splines. Too much backlash could result in premature wear of the driving pulley and/or the drive belt.

Therefore, the solution to the above-mentioned inconveniences should also have limited backlash.

SUMMARY

It is an object of the present invention to ameliorate at least some of the inconveniences present in the prior art.

The present provides a centrifugally actuated driving pulley for a CVT having a movable sheave that is connected to the fixed sheave via a ball spline assembly.

The present also provides a driving pulley for a CVT having a movable sheave that is connected to the fixed sheave via a ball spline assembly, where at least some of the outer grooves receiving the ball bearings of the ball spline assembly are angularly offset from at least some of the corresponding inner grooves receiving the ball bearings of the ball spline assembly, thus limiting the backlash.

The present also provides a driving pulley for a CVT having a movable sheave that is connected to the fixed sheave via a ball spline assembly, where at least some of the outer and inner grooves receiving the ball bearings of the ball spline assembly have a generally ogival cross-section.

The present also provides a driving pulley for a CVT having a movable sheave that is connected to the fixed sheave via a ball spline assembly and a damper assembly.

The present also provides a CVT having a driving pulley with the features of at least one of the above driving pulleys.

The present also provides a vehicle having the above CVT.

In one aspect, the present provides a driving pulley for a CVT having a first shaft having a plurality of axially extending first grooves, a fixed sheave disposed on the first shaft, the fixed sheave being axially and rotationally fixed relative to the first shaft; a second shaft disposed around the first shaft and having a plurality of axially extending second grooves, a plurality of ball bearings disposed radially between the first and the second shafts, each one of the plurality of ball bearings being disposed in one of the plurality of first grooves and in a corresponding one of the plurality of second grooves, and a movable sheave disposed on the second shaft, the movable sheave being axially and rotationally fixed relative to the second shaft. The movable sheave and the second shaft be are movable axially relative to the fixed sheave and the first shaft. The movable sheave and the second shaft are rotationally fixed relative to the fixed sheave and the first shaft by the plurality of ball bearings. A housing is disposed on the first shaft. The housing is axially and rotationally fixed relative to the first shaft. The movable sheave is disposed axially between the housing and the fixed sheave. At least one weighted arm is pivotally connected to one of the movable sheave and the housing. The at least one weighted arm pivots away from the first shaft and pushes against an other one of the movable sheave and the housing as a speed of rotation of the driving pulley increases, thereby moving the movable sheave and the second shaft axially toward the fixed sheave. A spring biases the movable sheave and the second shaft axially away from the fixed sheave.

In an additional aspect, one of the housing and the first shaft has at least one key and an other of the housing and the first shaft has at least one keyway. The at least one key is received in the at least one keyway.

In a further aspect, the first shaft has the at least one key and the housing has the at least one keyway. The at least one key is a plurality of keys forming external splines. The at least one keyway is a plurality of keyways forming internal splines.

In an additional aspect, at least one roller is connected to the other one of the movable sheave and the housing. The at least one roller is aligned with the at least one weighted arm. The at least one weighted arm pushes against the roller as the speed of rotation of the driving pulley increases.

In a further aspect, the at least one weighted arm is pivotally connected to the movable sheave and the at least one roller is connected to the housing.

In an additional aspect, at least two of the plurality of ball bearings are disposed in each set of corresponding first and second grooves.

In a further aspect, the plurality of first grooves is six first grooves, the plurality of second grooves is six second grooves, and the plurality of ball bearings is twenty-four ball bearings.

In an additional aspect, at least two seals are disposed radially between the first and the second shafts. The plurality of ball bearings is disposed axially between the at least two seals.

In a further aspect, at least some of the plurality of second grooves are angularly offset from corresponding first grooves of the plurality of first grooves.

In an additional aspect, half of the second grooves of the plurality of second grooves are angularly offset from the corresponding first grooves in a clockwise direction. A remaining half of the second grooves of the plurality of second grooves are angularly offset from the corresponding first grooves in a counter-clockwise direction.

In a further aspect, the first grooves of the plurality of first grooves are equally spaced from one another, and the second grooves of the plurality of second grooves are unequally spaced from one another.

In an additional aspect, the plurality of ball bearings moves toward the fixed sheave as the movable sheave and the second shaft move axially toward the fixed sheave. The plurality of ball bearings moves away from the fixed sheave as the movable sheave and the second shaft move axially away from the fixed sheave.

In a further aspect, the spring is compressed as the movable sheave and the second shaft move axially toward the fixed sheave.

In an additional aspect, the spring is disposed radially between the housing and the second shaft.

In another aspect, the present provides a driving pulley for a CVT having a first shaft, a fixed sheave disposed on the first shaft, the fixed sheave being axially and rotationally fixed relative to the first shaft a movable sheave disposed around the first shaft, the movable sheave being movable axially relative to the fixed sheave and the first shaft, the movable sheave being rotationally fixed relative to the fixed sheave and the first shaft, a ball spline assembly connecting the movable sheave to the first shaft, a housing disposed on the first shaft, the housing being axially and rotationally fixed relative to the first shaft, the movable sheave being disposed axially between the housing and the fixed sheave, a centrifugal actuation system disposed between the movable sheave and the housing, the centrifugal actuation system moving the movable sheave toward the fixed sheave as a speed of rotation of the driving pulley increases, and a spring biasing the movable sheave axially away from the fixed sheave.

In a further aspect, a second shaft is disposed around the first shaft. The movable sheave is disposed on the second shaft. The movable sheave is axially and rotationally fixed relative to the second shaft. The second shaft is movable axially relative to the fixed sheave and the first shaft together with the movable sheave. The second shaft is rotationally fixed relative to the fixed sheave and the first shaft. A plurality of ball bearings is disposed radially between the first shaft and the second shaft. The first shaft, the second shaft and the plurality of ball bearings form the ball spline assembly together.

In an additional aspect, at least two seals are disposed radially between the first and the second shafts. The plurality of ball bearings is disposed axially between the at least two seals.

In a further aspect, the plurality of ball bearings moves toward the fixed sheave as the movable sheave and the second shaft move axially toward the fixed sheave. The plurality of ball bearings moves away from the fixed sheave as the movable sheave and the second shaft move axially away from the fixed sheave.

In an additional aspect, one of the housing and the first shaft has at least one key, and an other of the housing and the first shaft has at least one keyway. The at least one key is received in the at least one keyway.

In a further aspect, the first shaft has the at least one key and the housing has the at least one keyway. The at least one key is a plurality of keys forming external splines. The at least one keyway is a plurality of keyways forming internal splines.

In an additional aspect, the centrifugal actuation system includes: at least one weighted arm being pivotally connected to one of the movable sheave and the housing, and at least one roller connected to the other one of the movable sheave and the housing, the at least one roller being aligned with the at least one weighted arm. The at least one weighted arm pushes against the roller as the speed of rotation of the driving pulley increases.

In a further aspect, the at least one weighted arm is pivotally connected to the movable sheave and the at least one roller is connected to the housing.

In an additional aspect, the spring is compressed as the movable sheave moves axially toward the fixed sheave.

In another aspect, the present provides a driving pulley for a CVT having a first shaft having a plurality of axially extending first grooves, a fixed sheave disposed on the first shaft, the fixed sheave being axially and rotationally fixed relative to the first shaft, a second shaft disposed around the first shaft and having a plurality of axially extending second grooves, at least some of the plurality of second grooves being angularly offset from their corresponding first grooves, a plurality of ball bearings disposed radially between the first and the second shafts, each one of the plurality of ball bearings being disposed in one of the plurality of first grooves and in a corresponding one of the plurality of second grooves, and a movable sheave disposed on the second shaft, the movable sheave being axially and rotationally fixed relative to the second shaft. The movable sheave and the second shaft are movable axially relative to the fixed sheave and the first shaft. The movable sheave and the second shaft are rotationally fixed relative to the fixed sheave and the first shaft. An actuation system is operatively connected to at least one of the movable sheave and the second shaft. The actuation system moves the movable sheave and the second shaft axially relative to the fixed sheave.

In a further aspect, at least two of the plurality of ball bearings are disposed in each set of corresponding first and second grooves.

In an additional aspect, the plurality of first grooves is six first grooves, the plurality of second grooves is six second grooves, and the plurality of ball bearings is twenty-four ball bearings.

In a further aspect, at least two seals are disposed radially between the first and the second shafts. The plurality of ball bearings is disposed axially between the at least two seals.

In an additional aspect, half of the second grooves of the plurality of second grooves are angularly offset from corresponding first grooves of the plurality of first grooves in a clockwise direction. A remaining half of the second grooves of the plurality of second grooves are angularly offset from corresponding first grooves of the plurality of first grooves in a counter-clockwise direction.

In a further aspect, the first grooves of the plurality of first grooves are equally spaced from one another. The second grooves of plurality of second grooves are unequally spaced from one another.

In an additional aspect, at least some of the plurality of second grooves are angularly offset from corresponding first grooves of the plurality of first grooves by less than one degree.

In a further aspect, the plurality of ball bearings moves toward the fixed sheave as the movable sheave and the second shaft move axially toward the fixed sheave. The plurality of ball bearings moves away from the fixed sheave as the movable sheave and the second shaft move axially away from the fixed sheave.

In an additional aspect, a spring biases the movable sheave and the second shaft axially away from the fixed sheave. The spring is compressed as the movable sheave and the second shaft move axially toward the fixed sheave.

In a further aspect, the actuation system is a centrifugal actuation system. The centrifugal actuation system includes: at least one weighted arm, and at least one roller in alignment with the at least one weighted arm.

In another aspect, the present provides a driving pulley for a CVT having a first shaft having a plurality of axially extending first grooves, at least some of the plurality of first grooves having a generally ogival cross-section, a fixed sheave disposed on the first shaft, the fixed sheave being axially and rotationally fixed relative to the first shaft, a second shaft disposed around the first shaft and having a plurality of axially extending second grooves, at least some of the plurality of second grooves having a generally ogival cross-section, a plurality of ball bearings disposed radially between the first and the second shafts, each one of the plurality of ball bearings being disposed in one of the plurality of first grooves and in a corresponding one of the plurality of second grooves, a movable sheave disposed on the second shaft, the movable sheave being axially and rotationally fixed relative to the second shaft. The movable sheave and the second shaft are movable axially relative to the fixed sheave and the first shaft. The movable sheave and the second shaft are rotationally fixed relative to the fixed sheave and the first shaft. An actuation system is operatively connected to at least one of the movable sheave and the second shaft. The actuation system moves the movable sheave and the second shaft axially relative to the fixed sheave.

In an additional aspect, at least two of the plurality of ball bearings are disposed in each set of corresponding first and second grooves.

In a further aspect, the plurality of first grooves is six first grooves, the plurality of second grooves is six second grooves, and the plurality of ball bearings is twenty-four ball bearings.

In an additional aspect, at least two seals are disposed radially between the first and the second shafts. The plurality of ball bearings is disposed axially between the at least two seals.

In a further aspect, the plurality of first grooves are axially aligned with the plurality of second grooves.

In an additional aspect, the generally ogival cross-sections include a rounded cusp.

In a further aspect, all of the plurality of first and second grooves have a generally ogival cross-section.

In an additional aspect, the plurality of ball bearings moves toward the fixed sheave as the movable sheave and the second shaft move axially toward the fixed sheave. The plurality of ball bearings moves away from the fixed sheave as the movable sheave and the second shaft move axially away from the fixed sheave.

In a further aspect, a spring biases the movable sheave and the second shaft axially away from the fixed sheave. The spring is compressed as the movable sheave and the second shaft move axially toward the fixed sheave.

In an additional aspect, the actuation system is a centrifugal actuation system. The centrifugal actuation system includes: at least one weighted arm, and at least one roller in alignment with the at least one weighted arm.

In yet another aspect, the present provides a driving pulley for a continuously variable transmission having a first shaft, a fixed sheave disposed on the first shaft, the fixed sheave being axially and rotationally fixed relative to the first shaft, a damper assembly connected to the first shaft, a ball spline assembly connected to the damper assembly, and a movable sheave disposed around the first shaft and connected to the ball spline assembly. The movable sheave is movable axially relative to the fixed sheave and the first shaft.

In a further aspect, torque is transmitted from the first shaft to the ball spline assembly and the movable sheave via the damper assembly.

In an additional aspect, a housing is disposed on the first shaft. The housing is axially fixed relative to the first shaft. The movable sheave is disposed axially between the housing and the fixed sheave. A centrifugal actuation system is disposed between the movable sheave and the housing. The centrifugal actuation system moves the movable sheave toward the fixed sheave as a speed of rotation of the driving pulley increases. A spring biases the movable sheave axially away from the fixed sheave.

In a further aspect, the centrifugal actuation system includes: at least one weighted arm being pivotally connected to one of the movable sheave and the housing, and at least one roller connected to the other one of the movable sheave and the housing, the at least one roller being aligned with the at least one weighted arm. The at least one weighted arm pushes against the roller as the speed of rotation of the driving pulley increases.

In an additional aspect, the at least one weighted arm is pivotally connected to the movable sheave and the at least one roller is connected to the housing.

In a further aspect, the damper assembly includes a first sleeve and a second sleeve. The first sleeve is made of elastomeric material, is disposed around the first shaft and is connected to the first shaft. The second sleeve is disposed around and is connected to the first sleeve.

In an additional aspect, a second shaft is disposed around the second sleeve. The movable sheave is disposed on the second shaft. The movable sheave is axially and rotationally fixed relative to the second shaft. The second shaft is movable axially relative to the fixed sheave and the first shaft together with the movable sheave. A plurality of ball bearings is disposed radially between the second sleeve and the second shaft. The second sleeve, the second shaft and the plurality of ball bearings form the ball spline assembly together.

In a further aspect, a second shaft is disposed around the first shaft. The movable sheave is disposed on the second shaft. The movable sheave is axially and rotationally fixed relative to the second shaft. The second shaft is movable axially relative to the fixed sheave and the first shaft together with the movable sheave. A sleeve is disposed radially between the first shaft and the second shaft and is connected to the damper assembly. A plurality of ball bearings is disposed radially between the sleeve and the second shaft. The sleeve, the second shaft and the plurality of ball bearings form the ball spline assembly together.

In an additional aspect, the first shaft has a plurality of axially extending first grooves. The sleeve has a plurality of axially extending second grooves. Each one of the plurality of ball bearings is disposed in one of the plurality of first grooves and in a corresponding one of the plurality of second grooves.

In a further aspect, a wheel is connected to the first shaft. The wheel is axially and rotationally fixed relative to the first shaft. An elastomeric ring is connected to the wheel. An inner ring is connected to the elastomeric ring such that the elastomeric ring is disposed axially between the wheel and the inner ring. The inner ring is connected to the sleeve.

In an additional aspect, a cap connects the inner ring to the sleeve. The cap, the inner ring and the sleeve are rotationally fixed relative to each other.

In yet another aspect, the present provides a CVT having a driving pulley according to one or more of the aspects recited above, a driven pulley having a fixed sheave and a movable sheave, and a belt disposed between the fixed and movable sheaves of the driving pulley and between the fixed and movable sheaves of the driven pulley. The belt transmits torque from the driving pulley to the driven pulley.

In another aspect, the present provides a vehicle having an engine, the CVT recited above, the driving pulley being operatively connected to the engine and being driven by the engine, and a propulsion element operatively connected to the driven pulley and propelling the vehicle.

In a further aspect, the propulsion element is an endless drive track and the vehicle is a snowmobile.

For purposes of this application, it should be understood that the term "fixed" used to describe that two or more elements do not move relative to each other does not exclude some relative movement between the two elements resulting from manufacturing tolerances. For example, an element which is splined onto a shaft will turn slightly relative to the shaft when the shaft starts to turn due to the play between the splines of the element and the shaft resulting from the manufacturing tolerances, but will quickly stop turning relative to the shaft as the shaft continues to rotate. In this example, the element is said to be rotationally fixed relative to the shaft, even though there is some play between the splines.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present driving pulley for a continuously variable transmission (CVT) will be described with respect to a snowmobile. However, it is contemplated that the driving pulley could be used in a CVT for other vehicles, such as, but not limited to, a motorcycle, a scooter, a three-wheel road vehicle and an all-terrain vehicle (ATV).

Figure 1:
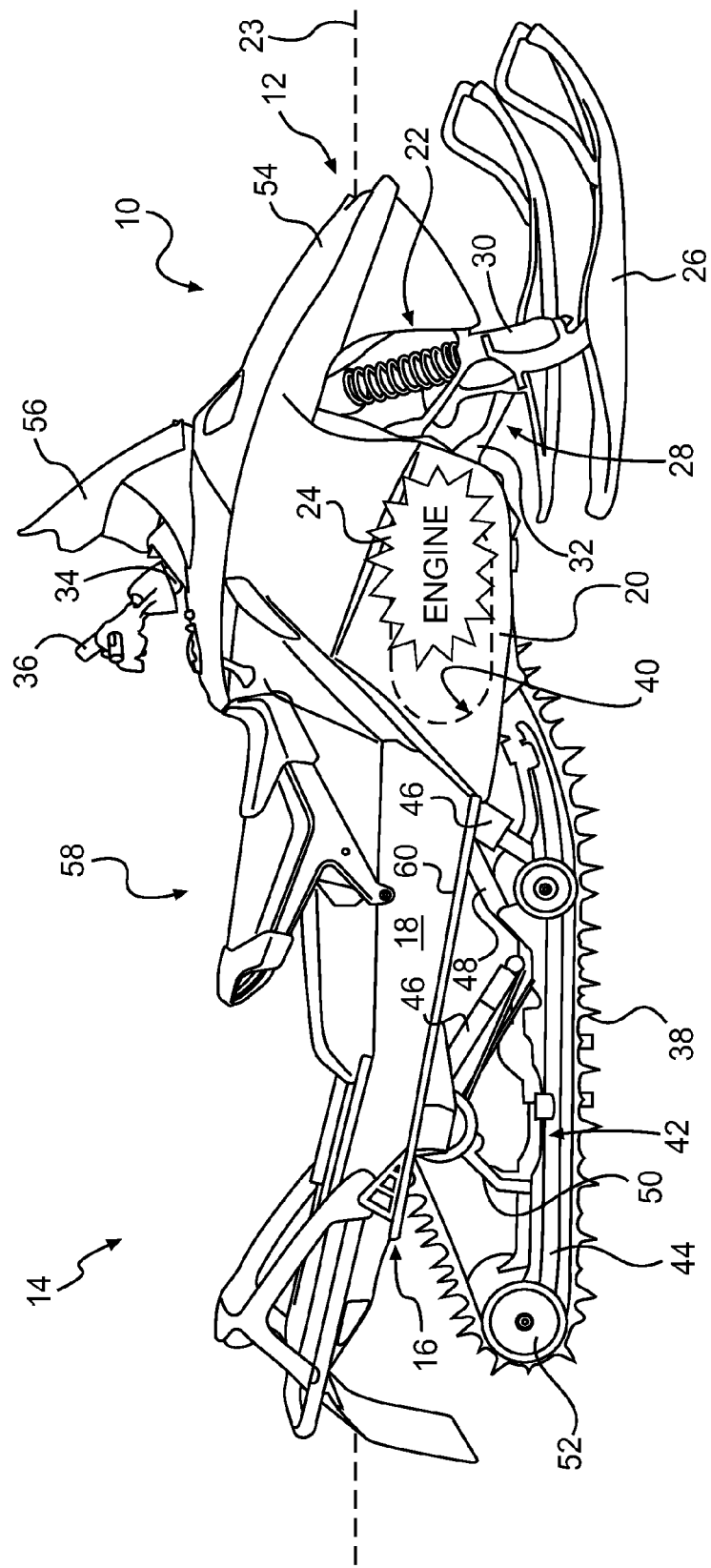
FIG. 1 is a right side elevation view of a snowmobile.

Turning now to FIG. 1, a snowmobile 10 includes a forward end 12 and a rearward end 14 which are defined consistently with a forward travel direction of the vehicle. The snowmobile 10 includes a frame 16 which normally includes a tunnel 18, an engine cradle portion 20 and a front suspension assembly portion 22. The tunnel 18 generally consists of sheet metal bent in an inverted U-shape which extends rearwardly along the longitudinal axis 23 of the snowmobile 10 and is connected at the front to the engine cradle portion 20. An internal combustion engine 24, which is schematically illustrated in FIG. 1, is carried by the engine cradle portion 20 of the frame 16. It is contemplated that the engine 24 could be replaced by an electric motor or an electric/internal combustion hybrid engine. A steering assembly is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively connecting the respective skis 26 to a steering column 34. A steering device in the form of handlebar 36, positioned forward of a rider, is attached to the upper end of the steering column 34 to allow the rider to rotate the ski legs 30 and thus the skis 26, in order to steer the snowmobile 10.

An endless drive track 38 is positioned at the rearward end 14 of the snowmobile 10. The drive track 38 is disposed generally under the tunnel 18, and is operatively connected to the engine 24 through CVT 40 illustrated schematically by broken lines and which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding the shock absorbers 46. Suspension arms 48 and 50 are provided to attach the slide rails 44 to the frame 16. One or more idler wheels 52 are also provided in the rear suspension assembly 42.

At the forward end 12 of the snowmobile 10, fairings 54 enclose the engine 24 and the CVT 40, thereby providing an external shell that protects the engine 24 and the CVT 40. The fairings 54 include a hood and one or more side panels which can be opened to allow access to the engine 24 and the CVT 40 when this is required, for example, for inspection or maintenance of the engine 24 and/or the CVT 40. In the particular snowmobile 10 shown in FIG. 1, the side panels can be opened along a vertical axis to swing away from the snowmobile 10. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the rider while the snowmobile 10 is moving.

The engine 24 is an internal combustion engine that is supported on the frame 16 and is located at the engine cradle portion 20. The internal construction of the engine 24 may be of any known type and can operate on the two-stroke or four-stroke principle. The engine 24 drives a crankshaft 25 (FIG. 7) that rotates about a horizontally disposed axis that extends generally transversely to the longitudinal axis 23 of the snowmobile 10. The crankshaft 25 drives the CVT 40 for transmitting torque to the endless drive track 38 for propulsion of the snowmobile 10 as described in greater detail below.

A straddle-type seat 58 is positioned atop the frame 16. A rear portion of the seat 58 may include a storage compartment or can be used to accommodate a passenger seat. Two footrests 60 are positioned on opposite sides of the snowmobile 10 below the seat 58 to accommodate the driver's feet.

Figure 2:
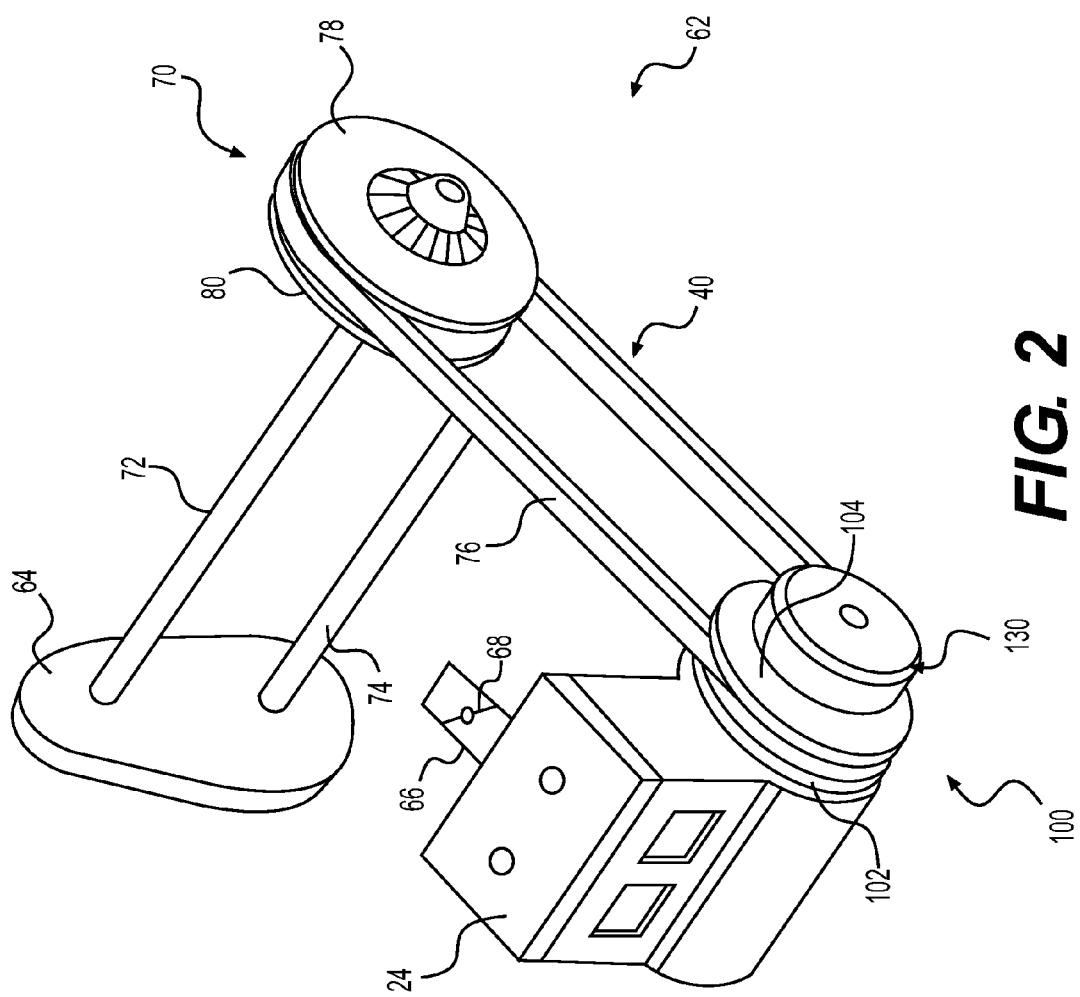
FIG. 2 is schematic representation of a perspective view, taken from a front, left side, of a powertrain of the snowmobile of FIG. 1.

FIG. 2 illustrates schematically a powertrain 62 of the snowmobile 10. The powertrain 62 includes the engine 24, the CVT 40 and a fixed ratio reduction drive 64. A throttle body 66 having a throttle valve 68 therein is connected to air intake ports of the engine 24 to control the flow of air to the engine 24. It is contemplated that the throttle body 66 could be replaced by a carburetor. The CVT 40 includes a driving pulley 100 coupled to the crankshaft 25 to rotate with the crankshaft 25 of the engine 24 and a driven pulley 70 coupled to one end of a transversely mounted jackshaft 72 which is supported on the frame 16 through bearings. As illustrated, the transversely mounted jackshaft 72 traverses the width of the engine 24. The opposite end of the transversely mounted jackshaft 72 is connected to the input member of the reduction drive 64 and the output member of the reduction drive 64 is connected to a drive axle 74 carrying sprocket wheels (not shown) that form a driving connection with the drive track 38.

The driving pulley 100 of the CVT 40 includes a pair of opposed frustoconical belt drive sheaves 102 and 104 between which the drive belt 76 is located. The drive belt 76 is made of rubber, but it is contemplated that it could be made of metal linkages. The driving pulley 100 will be described in greater detail below. The driven pulley 70 includes a pair of frustoconical belt drive sheaves 78 and 80 between which the drive belt 76 is located. As can be seen, the drive belt 76 is looped around both the driving pulley 100 and the driven pulley 70. The torque being transmitted to the driven pulley 70 provides the necessary clamping force on the drive belt 76 through its torque sensitive mechanical device in order to efficiently transfer torque to the further powertrain components. The effective diameters of the driving pulley 100 and the driven pulley 70 are the result of the equilibrium of forces on the drive belt 76 from the centrifugal actuation system 106 of the driving pulley 100 and the torque sensitive mechanism of the driven pulley 70.

In this particular example, the driving pulley 100 rotates at the same speed as the crankshaft 25 of the engine 24 whereas the speed of rotation of the transversely mounted jackshaft 72 is determined in accordance with the instantaneous ratio of the CVT 40, and the drive axle 74 rotates at a lower speed than the transversely mounted jackshaft 72 because of the action of the reduction drive 64. Typically, the input member of the reduction drive 64 consists of a small sprocket connected to the transversely mounted jackshaft 72 and coupled to drive an output member consisting of a larger sprocket connected to the drive axle 74 through a driving chain, all enclosed within the housing of the reduction drive 64.

It is contemplated that the driving pulley 100 could be coupled to an engine shaft other than the crankshaft 25, such as an output shaft, a counterbalance shaft, or a power take-off shaft driven by and extending from the engine 24. The shaft driving the driving pulley 100 is therefore generally referred to as the driving shaft. Although the present embodiment is being described with the crankshaft 25 being the driving shaft, it should be understood that other shafts are contemplated. Similarly, it is contemplated that the driven pulley 70 could be coupled to a shaft other than the transversely mounted jackshaft 72, such as directly to the drive axle 74 or any other shaft operatively connected to the propulsion element of the vehicle (i.e. the drive track 38 in the case of the snowmobile 10). The shaft driven by the driven pulley 70 is therefore generally referred to as the driven shaft. Although the present embodiment is being described with the transversely mounted jackshaft 72 being the driven shaft, it should be understood that other shafts are contemplated.

Turning now to FIGS. 3A to 13, the driving pulley 100 will be described in more detail. As discussed above, the driving pulley 100 includes a pair of opposed frustoconical belt drive sheaves 102 and 104. Both sheaves 102 and 104 rotate together with the crankshaft 25. The sheave 102 is fixed in an axial direction of the crankshaft 25, and is therefore referred to as the fixed sheave 102. The fixed sheave 102 is also rotationally fixed relative to the crankshaft 25. The sheave 104 can move toward or away from the fixed sheave 102 in the axial direction of the crankshaft 25 in order to change the drive ratio of the CVT 40, and is therefore referred to as the movable sheave 104. The movable sheave 104 is also rotationally fixed relative to the crankshaft 25 and the fixed sheave 102. As can be seen in FIG. 2, the fixed sheave 102 is disposed between the movable sheave 104 and the engine 24, however it is contemplated that the movable sheave 104 could be disposed between the fixed sheave 102 and the engine 24.

Figure 3A:
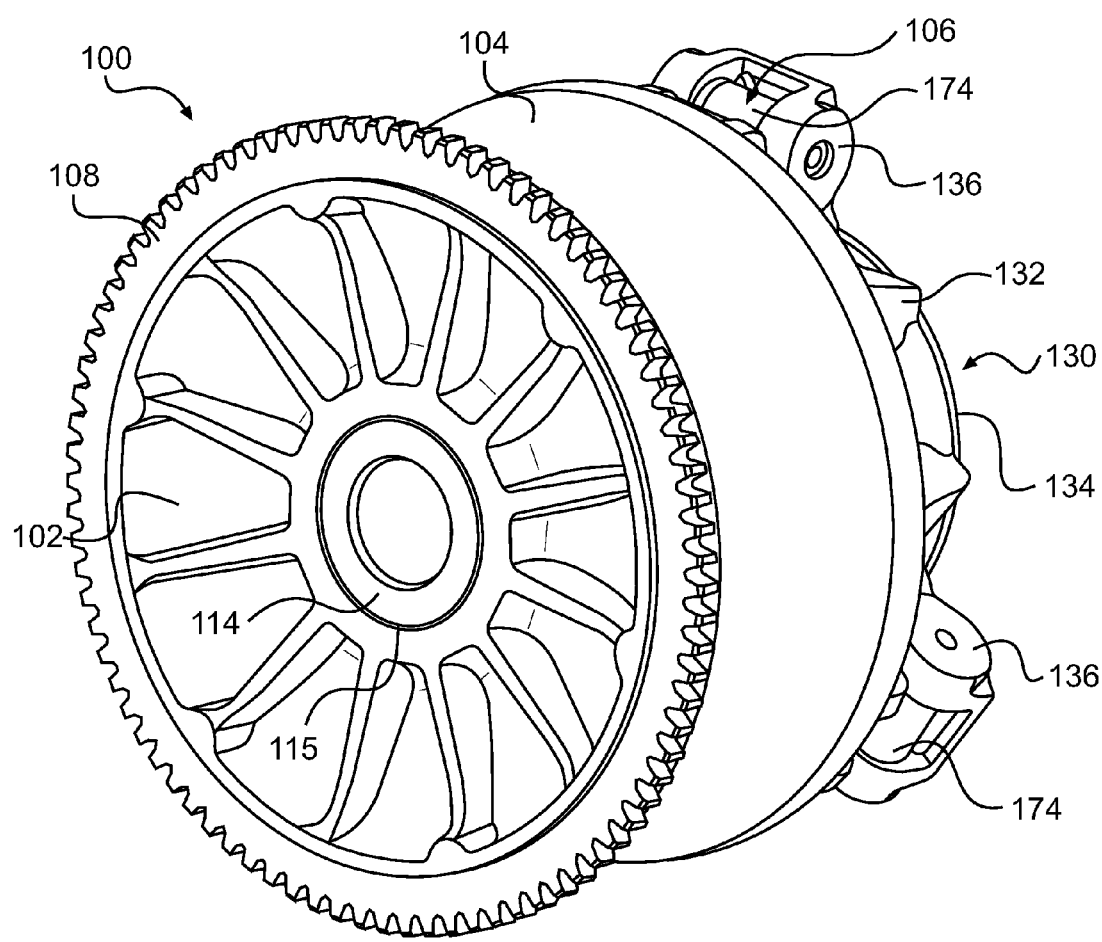
FIG. 3A is a perspective view, taken from a right side, of a driving pulley of a CVT of the powertrain of FIG. 2.
Figure 3B:
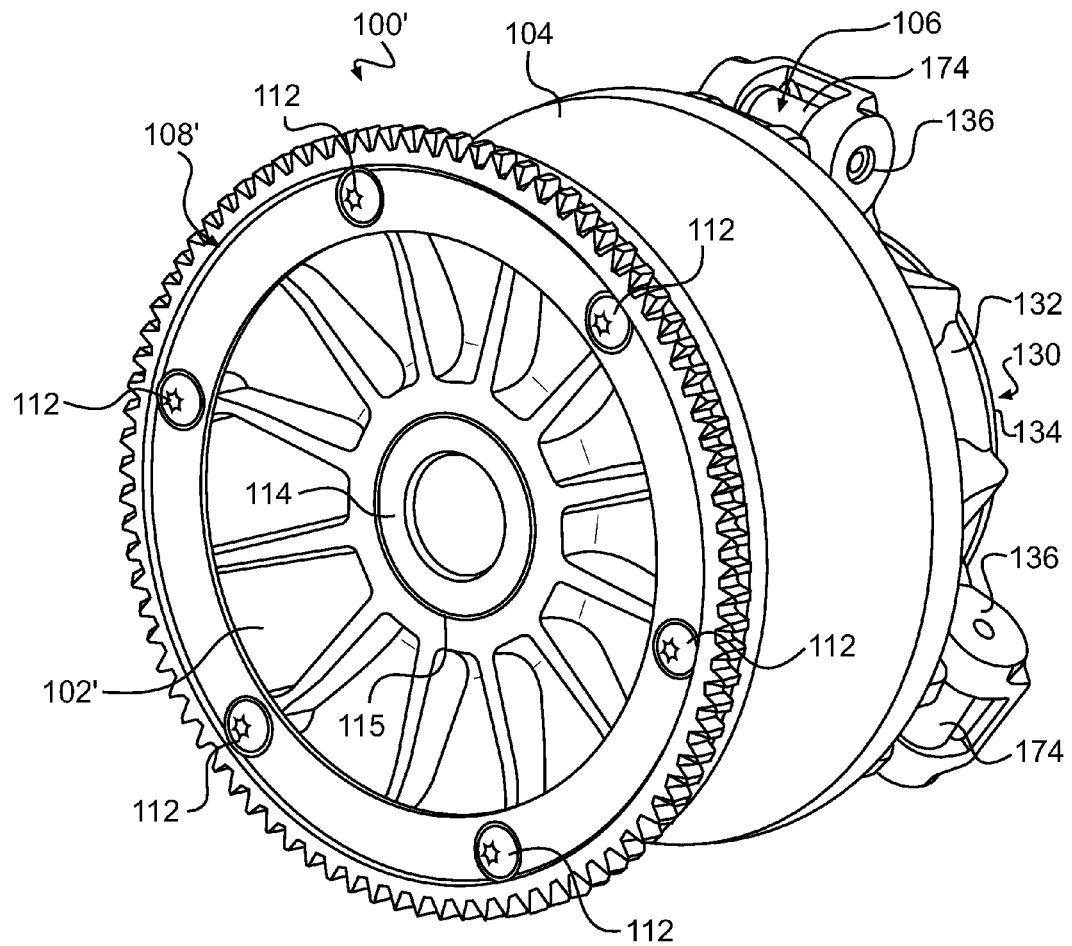
FIG. 3B is a perspective view, taken from a right side, of an alternative embodiment of the driving pulley of FIG. 3A.
Figure 4:
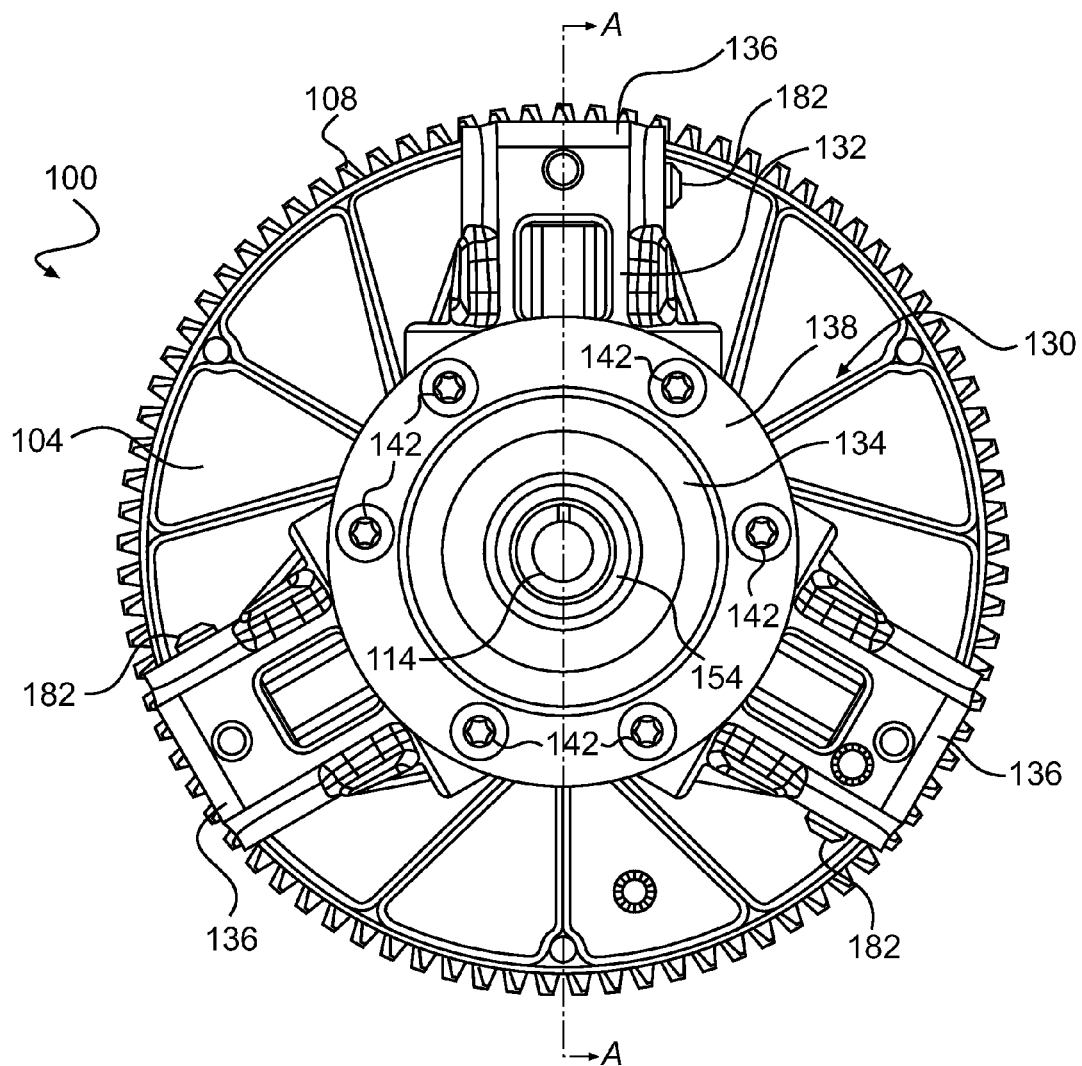
FIG. 4 is a left side elevation view of the driving pulley of FIG. 3A.
Figure 5:
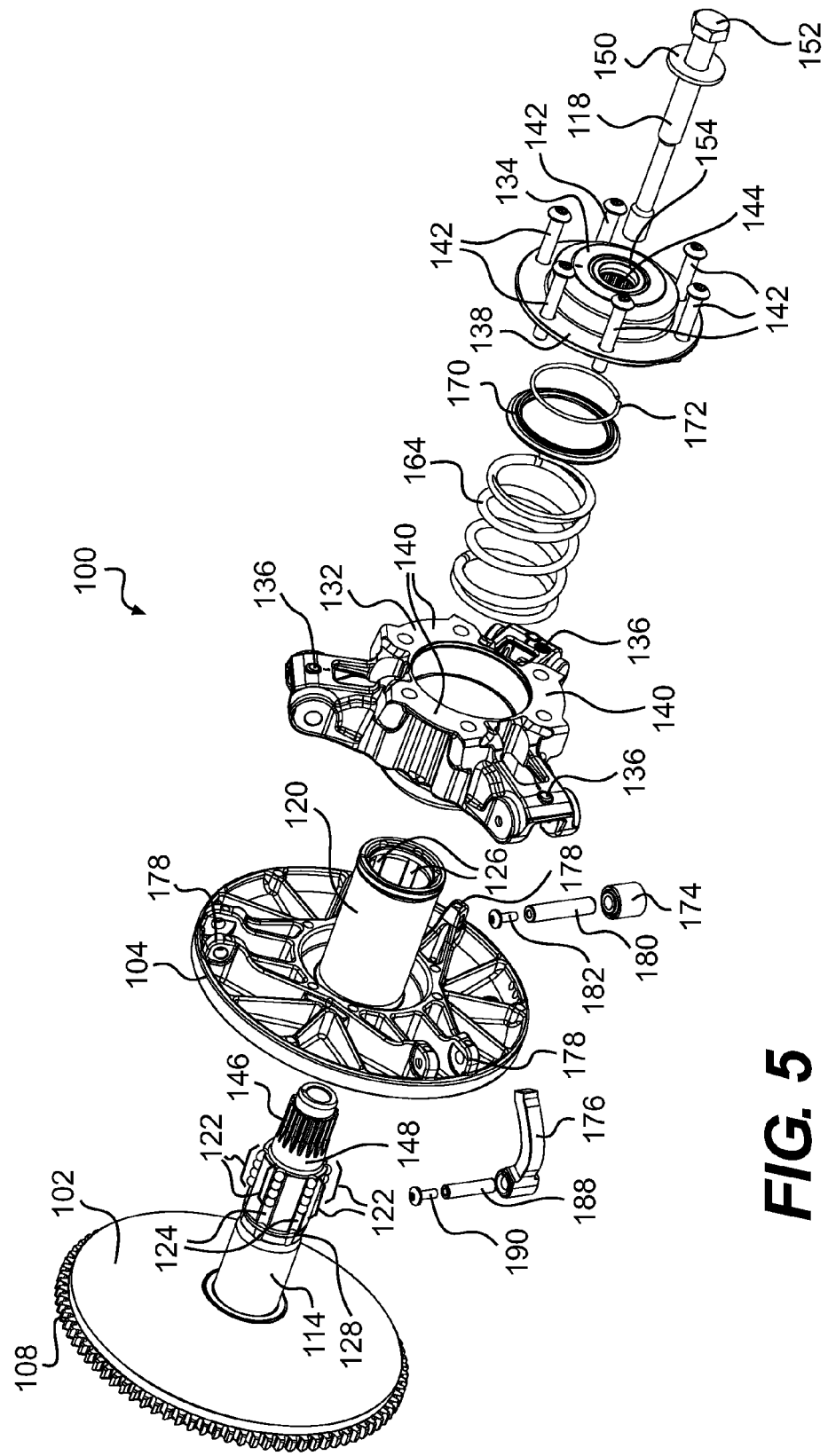
FIG. 5 is an exploded view of the driving pulley of FIG. 3A, with some of the elements omitted for clarity.
Figure 7:
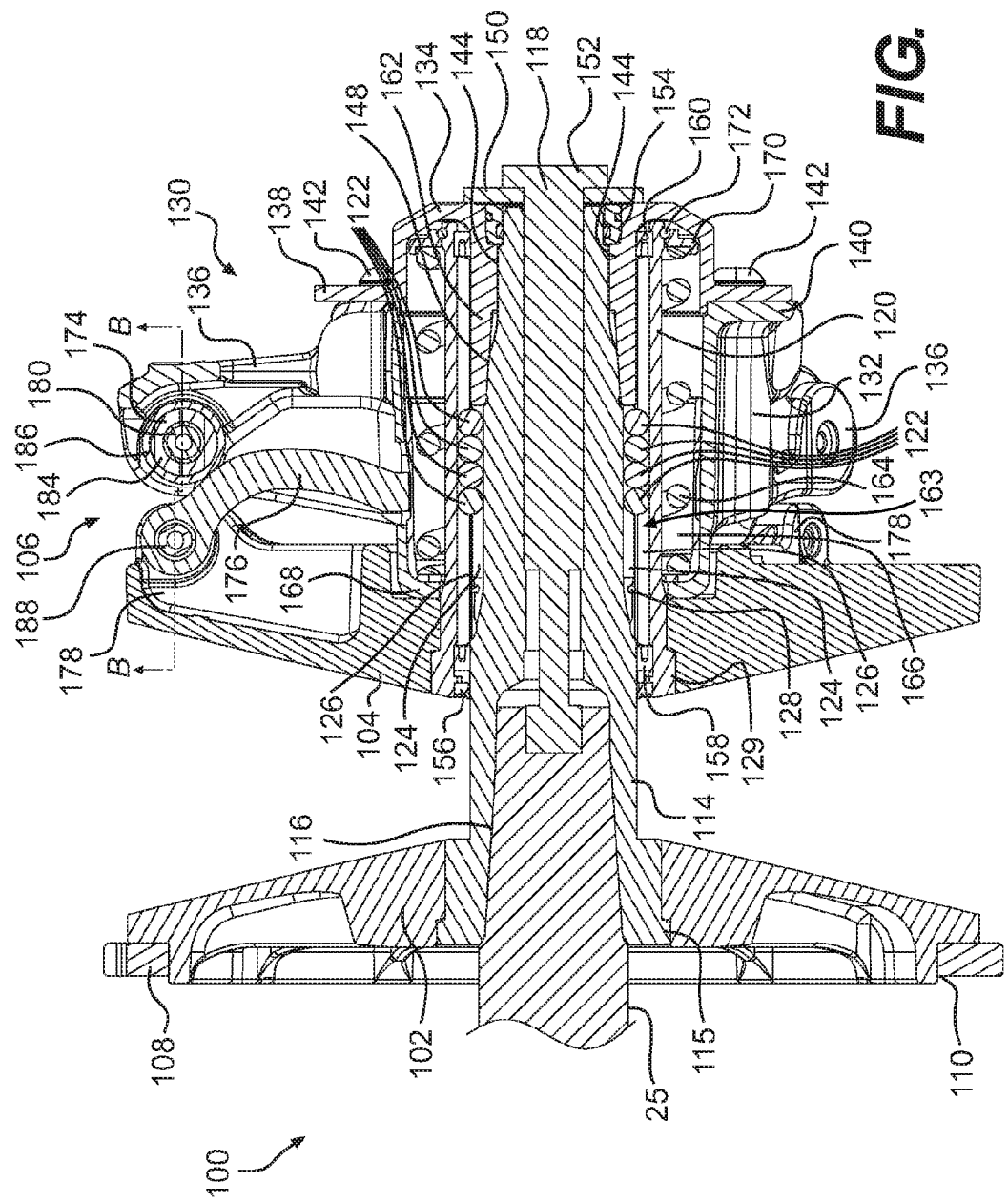
FIG. 7 is a cross-sectional view of the driving pulley of FIG. 3A taken through line A-A of FIG. 4, with the driving pulley in an opened position.

As best seen in FIGS. 3A and 7, a ring gear 108 is mounted on a flange 110 formed by the fixed sheave 102. The ring gear 108 is press-fitted on the flange 110 so as to be rotationally and axially fixed relative to the fixed sheave 102. The ring gear 108 is selectively engaged by a gear of a starter motor (not shown) of the engine 24. To start the engine 24, the starter motor engages the ring gear 108, which causes the fixed sheave 102, and the entire driving pulley 100, to turn. Since the fixed sheave 102 is rotational fixed relative to the crankshaft 25, the crankshaft 25 turns with the fixed sheave 102 which causes the movement of the pistons (not shown) of the engine 24 necessary to initiate the first combustion cycles needed to start the engine 24. Once the engine 24 has started, the gear of the starter motor disengages the ring gear 108 and the driving pulley 100 is turned by the engine 24 via the crankshaft. In an alternative embodiment shown in FIG. 3B, a driving pulley 100' has a fixed sheave 102' onto which a ring gear 108' is fastened via fasteners 112. The other features of the driving pulley 100' are the same as those of the driving pulley 100.

As best seen in FIG. 7, the fixed sheave 102 is mounted on a shaft 114. The fixed sheave 102 is press-fitted on the shaft 114 such that the fixed sheave 102 rotates with the shaft 114, and therefore rotates with the crankshaft 25. A raised portion 115 of the shaft 114 is knurled to increase the strength of the press-fit connection between the fixed sheave 102 and the shaft 114. It is contemplated that the fixed sheave 102 could be connected to the shaft 114 in other known manners to make the fixed sheave 102 rotationally and axially fixed relative to the shaft 114.

A portion 116 of the shaft 114 is taper-fitted on the end of the crankshaft 25 such that the shaft 114 and the fixed sheave 102 rotate with the crankshaft 25. It is contemplated that the shaft 114 could be connected to the crankshaft 25 in other known manners. For example, the shaft 114 could engage the crankshaft 25 via splines. A bolt 118 inserted inside the shaft 114 is screwed inside the end of the crankshaft 25, thus retaining the shaft 114, and therefore the fixed sheave 102, on the crankshaft 25.

A shaft 120 is disposed around the shaft 114. Ball bearings 122 are disposed in axially extending grooves 124, 126 (FIG. 11) in the outer surface of the shaft 114 and the inner surface of the shaft 120 respectively, as will be described in more detail below. The shaft 114, the shaft 120 and the ball bearings 122 together form a ball spline assembly. The ball bearings 122 transfer torque from the shaft 114 to the shaft 120 such that the shaft 120 rotates with the shaft 114 while permitting axial movement of the shaft 120 relative to the shaft 114. The shaft 120 is therefore rotationally fixed relative to the shaft 114. A retaining ring 128 disposed on the shaft 114 limits the movement of the ball bearings 122 inside the grooves 124, 126. The movable sheave 104 is mounted on the shaft 120.

The movable sheave 104 is press-fitted on the shaft 120 such that the movable sheave 104 rotates and moves axially with the shaft 120, and therefore rotates with the shaft 114 and the crankshaft 25. A raised portion 129 of the shaft 120 is knurled to increase the strength of the press-fit connection between the movable sheave 104 and the shaft 120. It is contemplated that the movable sheave 104 could be connected to the shaft 120 in other known manners to make the movable sheave 104 rotationally and axially fixed relative to the shaft 120.

A housing 130 is mounted on the end of the shaft 114 such that the movable sheave 104 is disposed axially between the housing 130 and the fixed sheave 102. The housing 130 includes a spider 132 and a cap 134. The spider 132 has three arms 136 and is disposed around the shaft 120. The cap 134 has a flange 138 fastened to corresponding flanges 140 of the spider 132 by fasteners 142.

The cap 134 has internal splines 144 (FIG. 7) that engage external splines 146 (FIG. 5) of the shaft 114 located near the end thereof. As a result, the cap 134, and therefore the housing 130, is rotationally fixed relative to the shaft 114 and will turn together with the shaft 114, the fixed sheave 102, the shaft 120 and the movable sheave 104. As would be understood, external and internal splines are a plurality of keys and keyways. As such it is contemplated that the splines could be replace by a key engaging a keyway. It is contemplated that other ways of connecting the cap 134 to the shaft 114 such that the cap 134 is rotationally fixed relative to the shaft 114 could be used. For example, the shaft 114 could have a flat side and the cap 134 could have a corresponding flat side. In another example, the end of the shaft 114 could have a polygonal cross-section with an opening in the cap 134 having a corresponding polygonal cross-section. In yet another example, the cap 134 could be fastened to the shaft 114. The cap 134 is held axially between a tapered portion 148 of the shaft 114 and a washer 150 (FIG. 7). The washer 150 is held between the head 152 of the bolt 118 and the end of the shaft 114. As a result, the cap 134, and therefore the housing 130, is axially fixed relative to the shaft 114 and the fixed sheave 102.

As can be seen in FIG. 7, a seal assembly 154 is disposed radially between the cap 134 and the shaft 114 at the end of the shaft 114. Two seals 156, 158 are disposed radially between the shaft 114 and the shaft 120 and axially between the ball bearings 122 and the fixed sheave 102. A seal 160 is disposed radially between an inner sleeve 162 of the cap 134 and the shaft 120 and axially between the ball bearings 122 and the end of the shaft 120 (the right end of the shaft 120 in FIG. 7). The cavity 163 defined axially between the seals 158 and 160 and radially between the shaft 114, the inner sleeve 162, and the shaft 120 is filled at least in part with lubricant. The ball bearings 122 are located inside this cavity 163. In one embodiment, the lubricant used is a grease such as Klüber Isoflex Topas NB 52 or Klüber Isoflex Topas NB 152. However, it is contemplated that other types of lubricants could be used. The seals 156, 158 and 160 prevent lubricant from leaking out of the cavity 163. The seal assembly 154 prevents lubricant from leaking out of the cavity 163 by passing between the inner sleeve 162 and the shaft 114.

Figure 10:
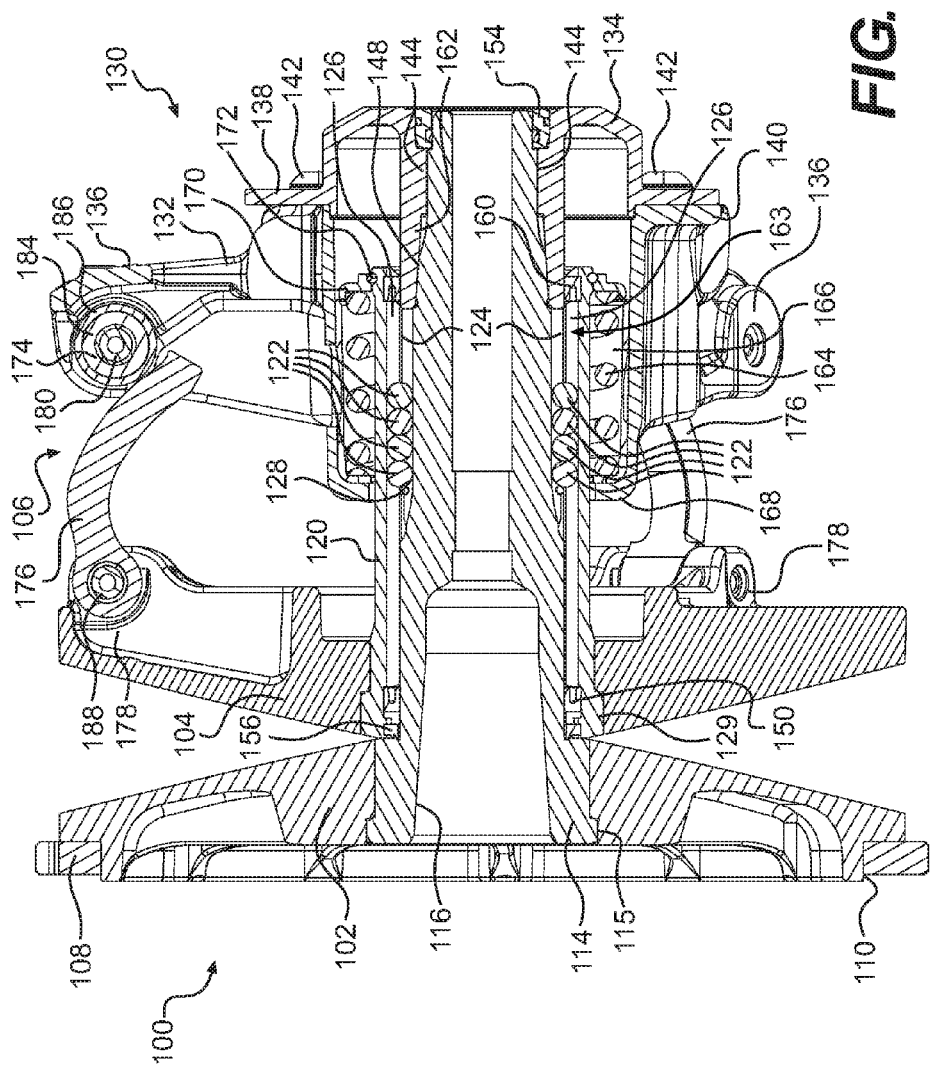
FIG. 10 is a cross-sectional view of the driving pulley of FIG. 3A taken through line A-A of FIG. 4, with the driving pulley in an closed position.

A coil spring 164 is disposed in a cavity 166 defined between the shaft 120 and the housing 130. At one end, the spring 164 abuts a flange 168 extending inwardly from the spider 132. As a result, this end of the spring 164 remains axially fixed when the movable sheave 104 and the shaft 120 move axially. At the opposite end, the spring 164 abuts a spring seat 170. The spring seat 170 is held in place on the end of the shaft 120 by the spring 164 and a C-clip 172. As a result, this end of the spring 164 moves axially when the movable sheave 104 and the shaft 120 move axially. As the movable sheave 104 and the shaft 120 move axially toward the fixed sheave 102, the spring 164 gets compressed as can be seen in FIG. 10. The spring 164 biases the movable sheave 104 and the shaft 120 away from the fixed sheave toward their position shown in FIG. 7.

Turning now to FIGS. 6 to 10, the centrifugal actuation system 106 of the driving pulley 100 will be described in more detail. The centrifugal actuation system 106 generally consists of three rollers 174 pivotally connected to the three arms 136 of the spider 132 and of three weighted arms 176 connected to three brackets 178 formed by the movable sheave 104. It is contemplated that the rollers 174 could be pivotally connected to the brackets 178 and that the weighted arms 176 could be connected to the arms 136. It is also contemplated that there could be more or less than three weighted arms 176, in which case there would be a corresponding number of arms 136, rollers 174 and brackets 178. It is also contemplated that the rollers 174 could be omitted and replaced with surfaces against which the weighted arms 176 can slide as they pivot. As can be seen, each roller 174 is aligned with a corresponding weighted arm 176. Since the housing 130 and the movable sheave 104 are rotationally fixed relative to the shaft 114, the rollers 174 remain aligned with the weighted arm 176 when the shaft 114 rotates.

Figure 8:
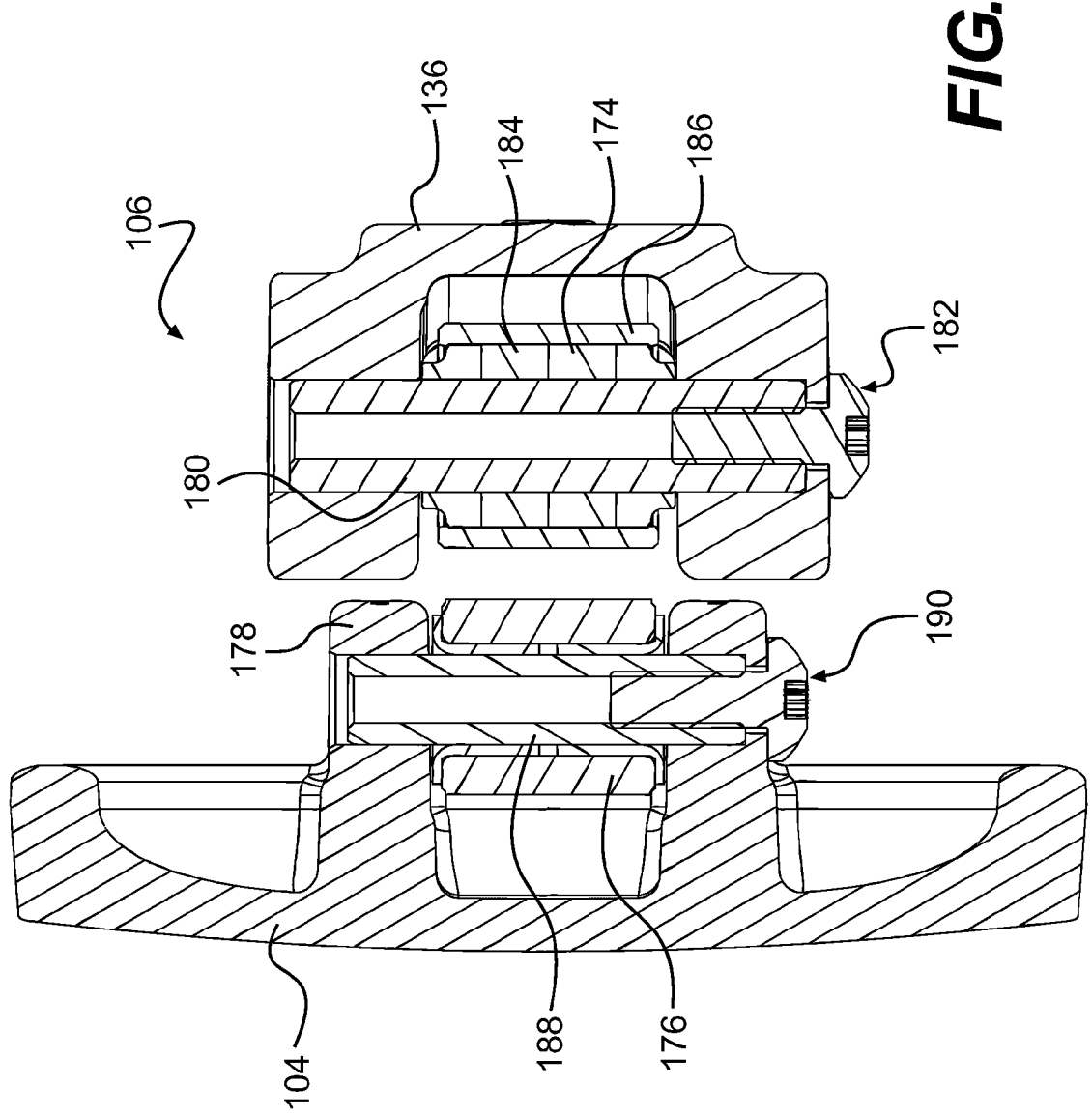
FIG. 8 is a cross-sectional view take of the driving pulley of FIG. 3A taken through line B-B of FIG. 7.
Figure 9:
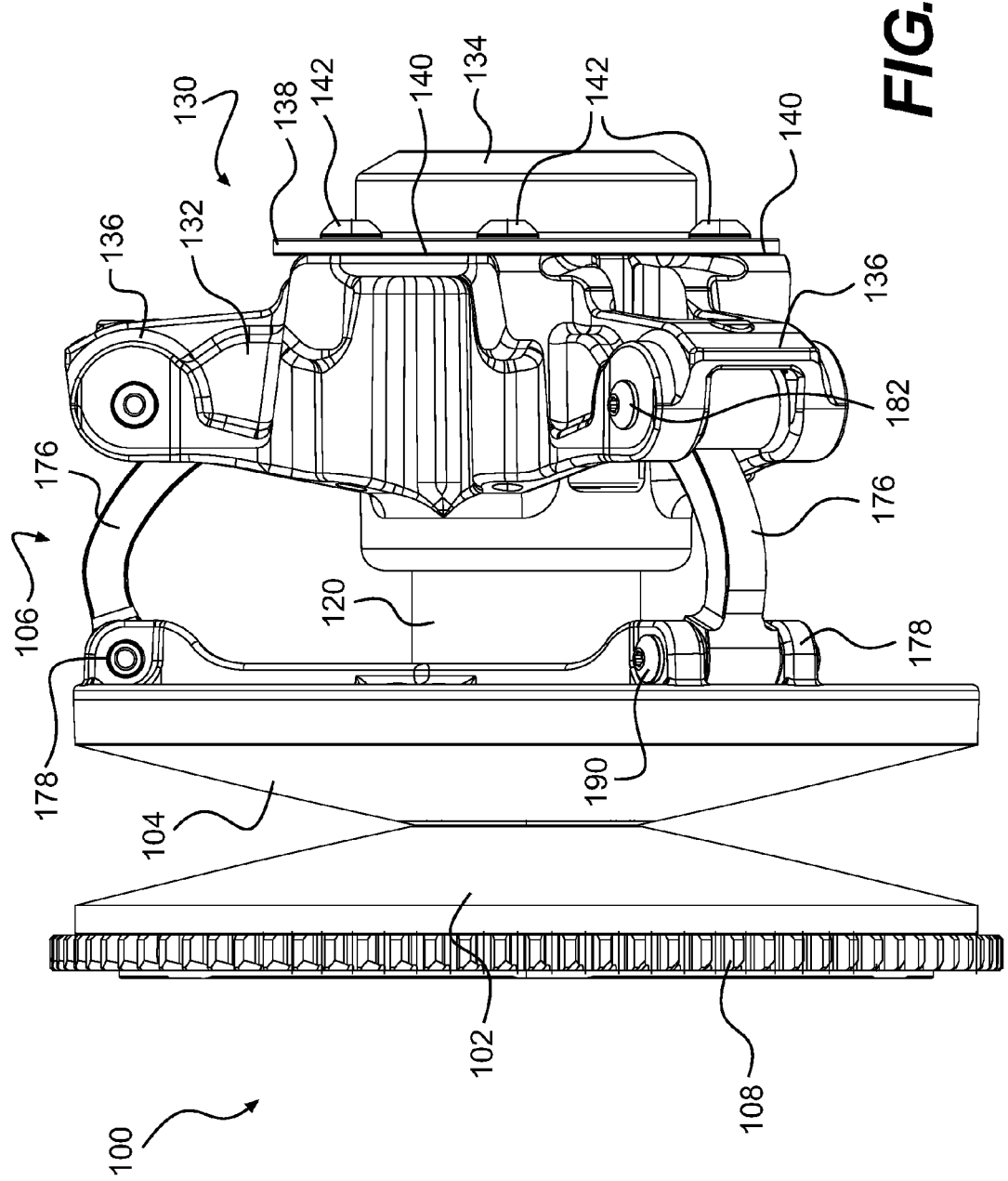
FIG. 9 is a front elevation view of the driving pulley of FIG. 3A, with the driving pulley in an closed position.

As best seen in FIG. 8, each roller 174 is disposed around an axle 180. The axle 180 is inserted into apertures in the arm 136. A threaded fastener 182 fastens the axle 180 to the arm 136. As can also be seen in FIG. 8, the roller 174 has an inner body 184 around which a sleeve 186 is disposed. Similarly, each weighted arm 176 is disposed around an axle 188. The axle 188 is inserted into apertures in the bracket 178. A threaded fastener 190 fastens the axle 188 to the bracket 178.

Figure 6:
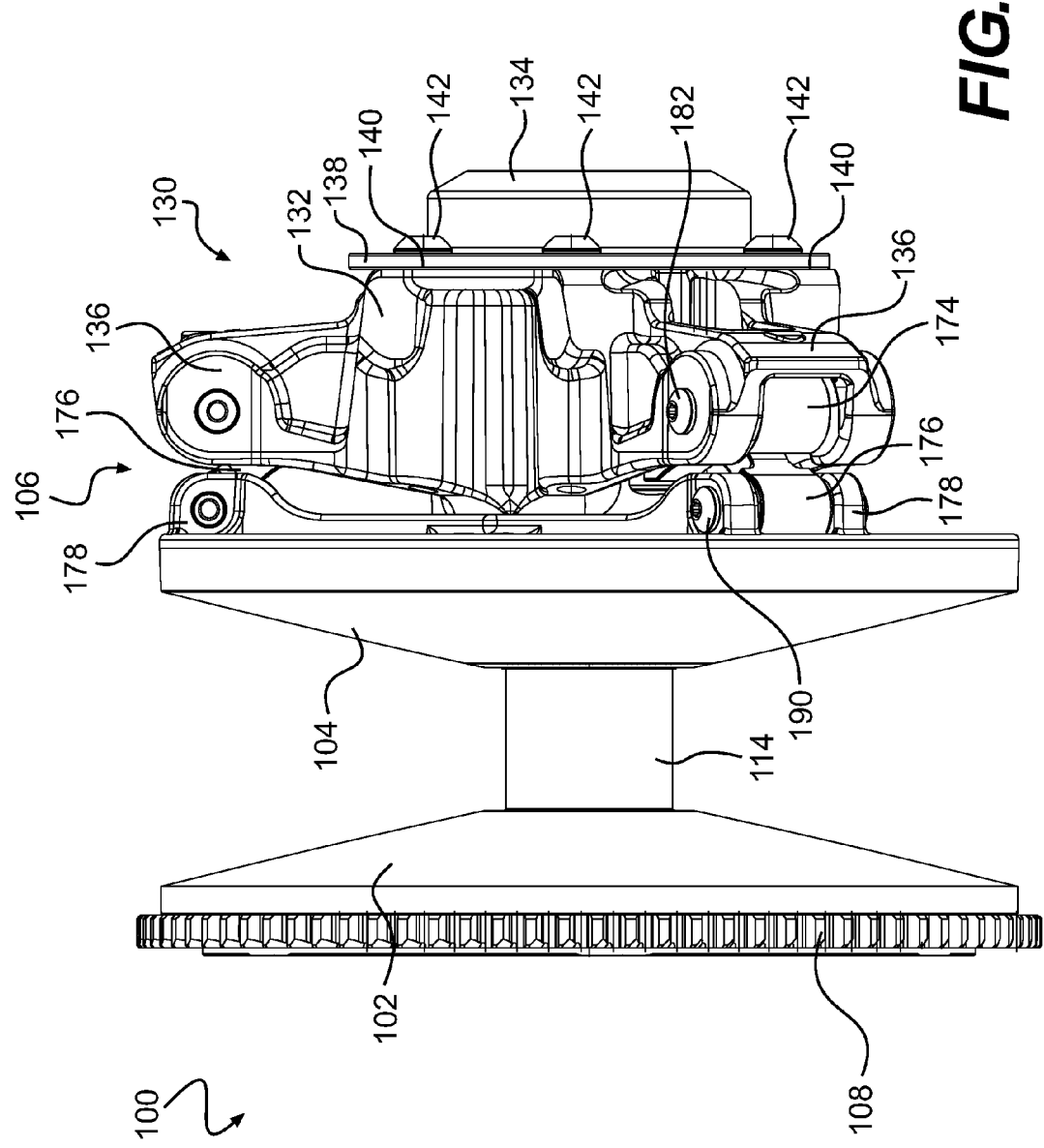
FIG. 6 is a front elevation view of the driving pulley of FIG. 3A, with the driving pulley in an opened position.

When the crankshaft 25 is not turning or is turning at low speeds, the driving pulley 100 is in the configuration shown in FIGS. 6 and 7. As the speed of rotation of the crankshaft 25 increases, the speed of rotation of the driving pulley 100 increase with it. As a result, the weighted arms 176 pivot about their axles 188 away from the shaft 114 and the shaft 120. As they pivot, the weighted arms 176 push against the rollers 174 thereby moving the movable sheave 104 and the shaft 120 axially toward the fixed sheave. When the speed of rotation of the crankshaft 25 is high enough, the movable sheave 104 and the shaft 120 move to the position shown in FIGS. 9 and 10, which is as close as the movable sheave 104 can be to the fixed sheave 102. As the speed of rotation of the crankshaft 25 decreases, the weighted arms 176 pivot about their axles 188 toward the shaft 114 and the shaft 120 and the spring 164 moves the movable sheave 104 and the shaft 120 axially away from the fixed sheave 102.

As the movable sheave 104 and the shaft 120 move axially toward or away from the fixed sheave 102, the ball bearings 122 roll inside their grooves 124, 126 in the same direction as the movable sheave 104 and the shaft 120. The ball bearings 122 therefore facilitate the relative axial movement between the shaft 114 and the shaft 120. The seals 156, 158 and 160 also move axially together with the movable sheave 104 and the shaft 120.

Figure 11:
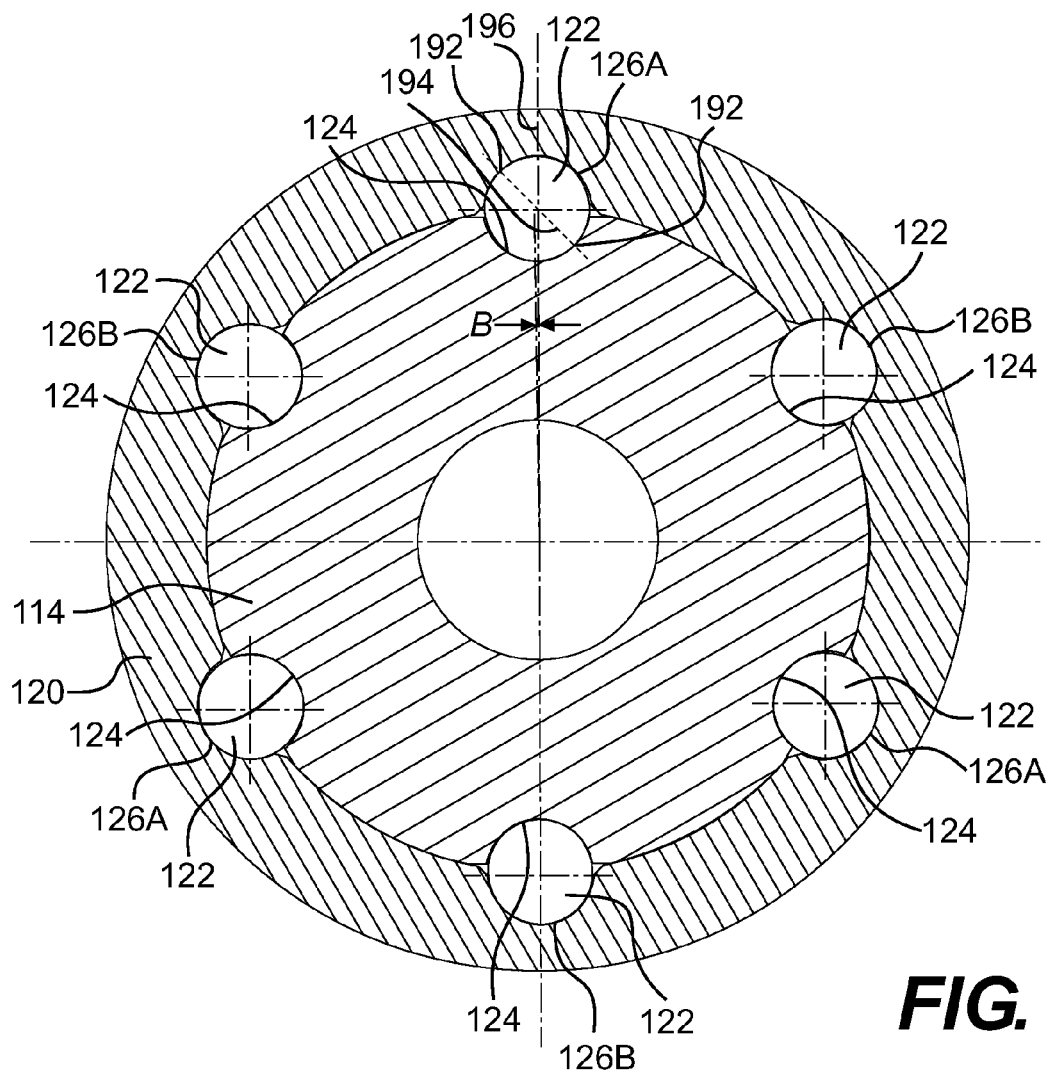
FIG. 11 is a transverse cross-section of a ball spline assembly of the driving pulley of FIG. 3A.
Figure 12:
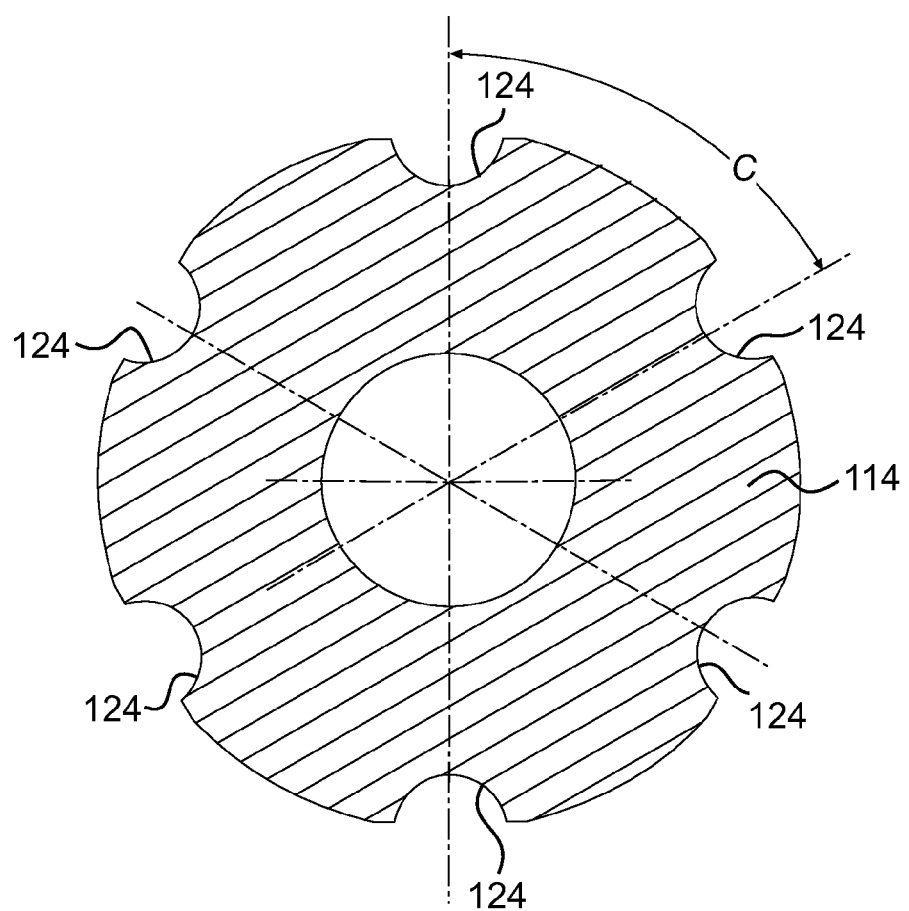
FIG. 12 is a transverse cross-section of an inner shaft of the ball spline assembly of FIG. 11.
Figure 13:
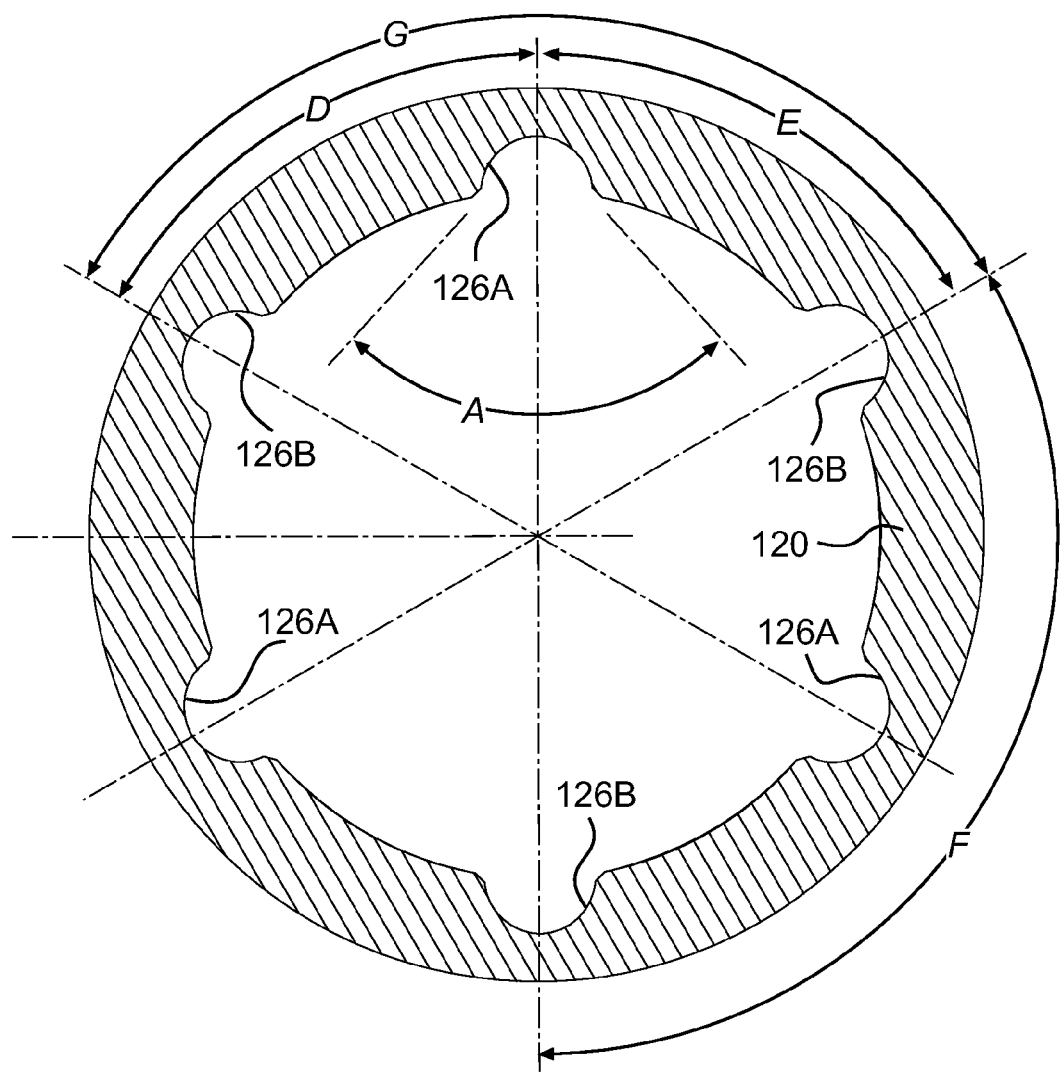
FIG. 13 is a transverse cross-section of an outer shaft of the ball spline assembly of FIG. 11.

Turning now to FIGS. 11 to 13, the ball spline assembly will be described in more detail. As previously mentioned, the ball spline assembly include the shaft 114, the shaft 120 and the ball bearings 122. The retaining ring 128 limits the movement of the ball bearings 122 toward the fixed sheave 102. The inner sleeve 162 of the cap 134 limits the movement of the ball bearings 122 away from the fixed sheave 102. The shaft 114 has six grooves 124. The shaft 120 has six corresponding grooves 126. It is contemplated that the shaft 114 could have more or less than six grooves 124, in which case the shaft would have a corresponding number of grooves 126. It is also contemplated that the shaft 114 and the shaft 120 could have a different number of grooves 124, 126, however in such an embodiment, not every groove 124 and/or 126 would receive one of the ball bearings 122. Each set of grooves 124, 126 (i.e. a groove 124 and its corresponding groove 126) receives four ball bearings 122. There are therefore twenty-four ball bearings 122. It is contemplated that there could be more or less than twenty-four ball bearings 124. It is also contemplated that not every set of grooves 124, 126 could have the same number of ball bearings 122 received therein. It is also contemplated that some sets of grooves 124, 126 could not have any ball bearings 122 received therein.

The cross-section of the grooves 124 is the form of an arc having a radius equal to or slightly larger than a radius of the ball bearings 122. Similarly, the cross-section of the grooves 126 is also in the form of an arc having a radius equal to or slightly larger than a radius of the ball bearings 122. The edges of the grooves 126 are flared. This creates gaps between the ball bearings 122, the shaft 114 and the shaft 120 to permit lubricant to flow around the ball bearings 122 as the ball bearing 122 roll in the grooves 124, 126. The flarings of the edges of the grooves 126 define an angle A (FIG. 13) therebetween. In the present embodiment, the angle A is 90 degrees. It is contemplated that the angle A could be more or less than 90 degrees. It is also contemplated that the grooves 124 could also have flared edges, or that only the grooves 124 could have flared edges.

Due to manufacturing tolerances, there is some play between the ball bearing 122 and the grooves 124, 126, which if left unaddressed, would cause backlash which can lead to premature wear of the ball spline assembly and of the centrifugal actuation system 106. In order to reduce the backlash, corresponding grooves 124 and 126 of the present embodiment are angularly offset from each other. With respect to FIG. 11, the grooves 126A are angularly offset clockwise relative to their corresponding grooves 124 and the grooves 126 B are angularly offset counter-clockwise relative to their corresponding grooves 124. As can be seen, half of the grooves 126 (i.e. the three grooves 126A) are angularly offset in the clockwise direction relative to their corresponding grooves 124 and half of the grooves 126 (i.e. the three grooves 126B) are angularly offset in the counter-clockwise direction relative to their corresponding grooves 124. It is also contemplated that the number of grooves 126A angularly offset clockwise relative to the grooves 124 could be different from the number of grooves 128B angularly offset counter-clockwise relative to the grooves 124. It is also contemplated that not all of the grooves 126 could be angularly offset relative to the grooves 124. The grooves 126A and 126B are angularly offset from their corresponding grooves 124 by an angle B. In the present embodiment, the angle B is approximately 0.3 degrees. It is contemplated that the angle B could be between 0.25 and 0.35 degrees. It is also contemplated that the angle B could be between 0.15 and 0.45 degrees. It is also contemplated that the angle B could be any non-zero angle less than 1 degree. It is also contemplated that the angle B could be equal to or greater than 1 degree depending on the diameter of the ball bearings 122.

As described below, the angular offsets between the grooves 124 and 126 is achieved in the present embodiment by having the grooves 124 equally spaced from one another and by having the grooves 126 unequally spaced from one another. However it is contemplated that the angular offsets could be achieved by having the grooves 124 unequally spaced from one another and by having the grooves 126 equally spaced from one another. It is also contemplated that the angular offsets could be achieved by having the grooves 124 unequally spaced from one another and by having the grooves 126 could be unequally spaced from one another. As can be seen in FIG. 12, consecutive grooves 124 are spaced from one another by an angle C. Since there are six grooves 124, the angle C is 60 degrees. As can be seen in FIG. 13, and with respect to FIG. 13, each groove 126B is spaced from its consecutive groove 126A in the clockwise direction by an angle D, and each groove 126A is spaced from its consecutive groove 126B in the clockwise direction by an angle E. In the present embodiment, with an offset angle B of approximately 0.3 degrees, the angle D is approximately 60.6 degrees and the angle E is approximately 59.4 degrees. Consecutive grooves 126A are spaced from each other by an angle F and consecutive grooves 126 are spaced from each other by an angle G. Since there are three grooves 126 and three grooves 126B, both the angles F and G are 120 degrees.

As shown for the top ball bearing 122 in FIG. 11, angularly offsetting the grooves 126 relative to the grooves 124 causes the ball bearings 122 to contact the grooves 124 and 126 at contact points or surfaces 192 that are disposed generally opposite each other such that a line passing through the points or surfaces 192 forms a diagonal 194 relative to a line 196 passing through a center of the ball spline assembly. The orientation of the diagonal 194 depends on the direction of the angular offset between the corresponding grooves 124,126. The orientation of the diagonal 194 relative to the line 196 determines the direction of the loads for which a set of a groove 124, a groove 126 and the ball bearings disposed therein reduce backlash. For example, for the top ball bearing 122 in FIG. 11, the groove 126A being angularly offset clockwise relative to the groove 124 results in a diagonal 194 having a negative slope. As a result, ball bearing 122 will contact the grooves 124 and 126A so as to help reduce backlash that result from a counter-clockwise load applied by the shaft 114 or a clockwise load applied by the shaft 120. Similarly, the grooves 126B being angularly offset counter-clockwise relative to the grooves 124 help reduce backlash that result from loads applied in the opposite directions.

Figure 14:
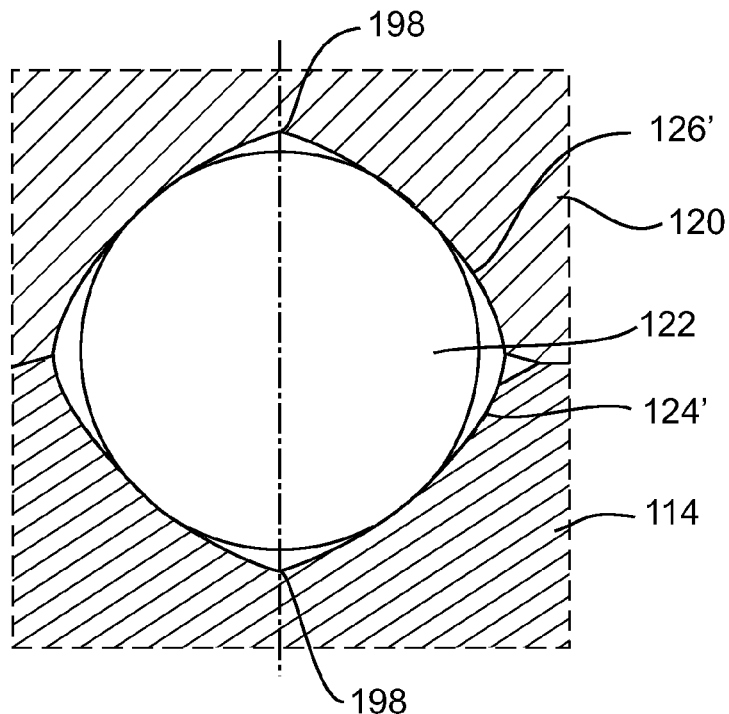
FIG. 14 is a transverse cross-section of a ball bearing and corresponding grooves of an alternative embodiment of a ball spline assembly for the driving pulley of FIG. 3A.

In an alternative embodiment of a ball spline assembly shown in FIG. 14, in order to help reduce backlash, instead of angularly offsetting the grooves 124 and 126 from each other as indicated in the embodiment shown in FIGS. 11 to 13, the grooves 124' and 126' are angularly aligned with each other and have a generally ogival cross-section. The ogival cross-sections ensure that the ball bearings 122 disposed in the grooves 124' and 126' contact the grooves 124' and 126' on both sides thereof. Therefore, each ball bearing 122 has four contact points with the grooves 124' and 126'. The spaces between the apexes 198 of the grooves 124' and 126' and the ball bearings 122 permit lubricant to flow around the ball bearings 122 as the ball bearing 122 roll in the grooves 124', 126'. It is contemplated that only some of the grooves 124' and 126' may have a generally ogival cross-section.

Figure 15:
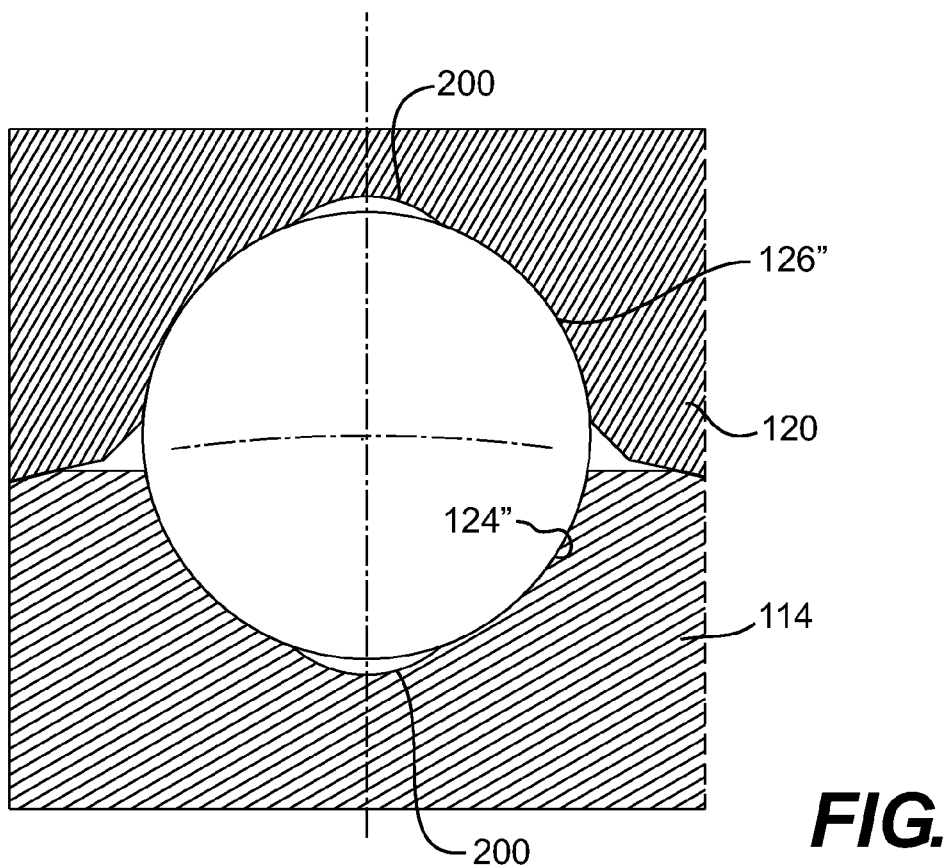
FIG. 15 is a transverse cross-section of a ball bearing and corresponding grooves of another alternative embodiment of a ball spline assembly for the driving pulley of FIG. 3A.

In another alternative embodiment of a ball spline assembly shown in FIG. 15, the grooves 124" and 126" are, as in the embodiment of FIG. 14, angularly aligned with each other and have a generally ogival cross-section. As can be seen, the cross-sections of the grooves are more rounded than in FIG. 14, but are nonetheless not semi-circular. The left and right sides of each of the grooves 124" and 126" have different centers of curvature, and as such the grooves 124" and 126" have ogival cross-sections. As in the embodiment of FIG. 14, the ogival cross-sections ensure that the ball bearings 122 disposed in the grooves 124" and 126" contact the grooves 124" and 126" on both sides thereof. Therefore, each ball bearing 122 has four contact points with the grooves 124" and 126". The each of the grooves 124" and 126" also include a cusp 200. The cusps 200 permit lubricant to flow around the ball bearings 122 as the ball bearing 122 roll in the grooves 124", 126". It is contemplated that only some of the grooves 124" and 126" may have a generally ogival cross-section.

Other aspects of the ball spline assemblies of FIGS. 14 and 15 are the same as or similar to the ball spline assembly shown in FIGS. 11 to 13 and as such will not be described in detail herein.

Figure 16:
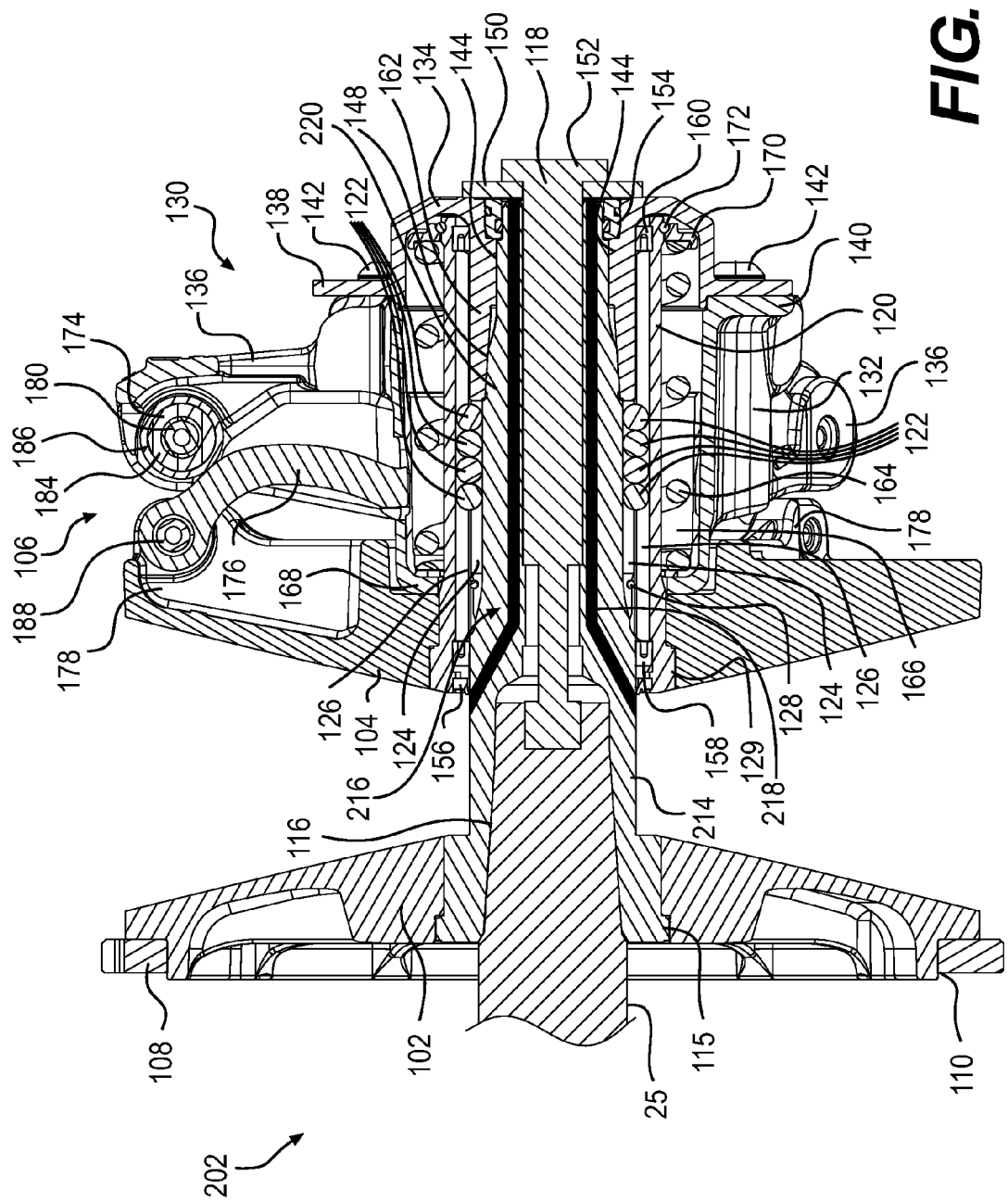
FIG. 16 is a cross-sectional view of an alternative embodiment of a driving pulley of a CVT, with the driving pulley in an opened position.

Turning now to FIG. 16, a driving pulley 202 will now be described. The driving pulley 202 is an alternative embodiment of the driving pulley 100 described above and can be used in the CVT 40 described above instead of the driving pulley 100. For simplicity, elements of the driving pulley 202 that are similar to those of the driving pulley 100 have been labeled with the same reference numerals and will not be described again in detail.

The fixed sheave 102 is mounted to a shaft 214 in the same manner that the fixed sheave 102 is mounted to the shaft 114 in the driving pulley 100. A damper assembly 216 is disposed around the end of the shaft 214. The damper assembly 216 consists of a sleeve 218 of elastomeric material and a metallic sleeve 220. The sleeve 220 is made of the same metal as the shaft 214, but it is contemplated that a different metal, or even a different, non-metallic material could be used. The sleeve 218 is disposed between the shaft 214 and the sleeve 220. The sleeve 218 is bonded to both the shaft 214 and the sleeve 220. In one example, the shaft 214 and the sleeve 220 are inserted into a mold, rubber material that is used to form the sleeve 218 is injected in the mold between the shaft 214 and the sleeve 220, the rubber material is then vulcanized inside the mold which also causes it to bond to both the shaft 214 and the sleeve 220. It is contemplated that the sleeve 218 could be connected to the shaft 214 and the sleeve 220 in other ways. For example, the sleeve 218 could be mechanically interlocked with both the shaft 214 and the sleeve 220. The elastomeric material used for the sleeve 218 reduces the transmission of vibrations between the engine 24 (through the shafts 25 and 214) and the movable sheave 104. In the example above, the elastomeric material is vulcanized rubber, but it is contemplated that other types of elastomeric materials could be used.

The sleeve 220 has axially extending grooves 124 formed thereon to receive the ball bearings 122. As such, the sleeve 220 also forms part of the ball spline assembly of the driving pulley 202. In the present embodiment, the elements of the driving pulley 100 that were connected to the end of the shaft 114 in the embodiment described above are now connected to the sleeve 220 in the same manner.

Figure 17:
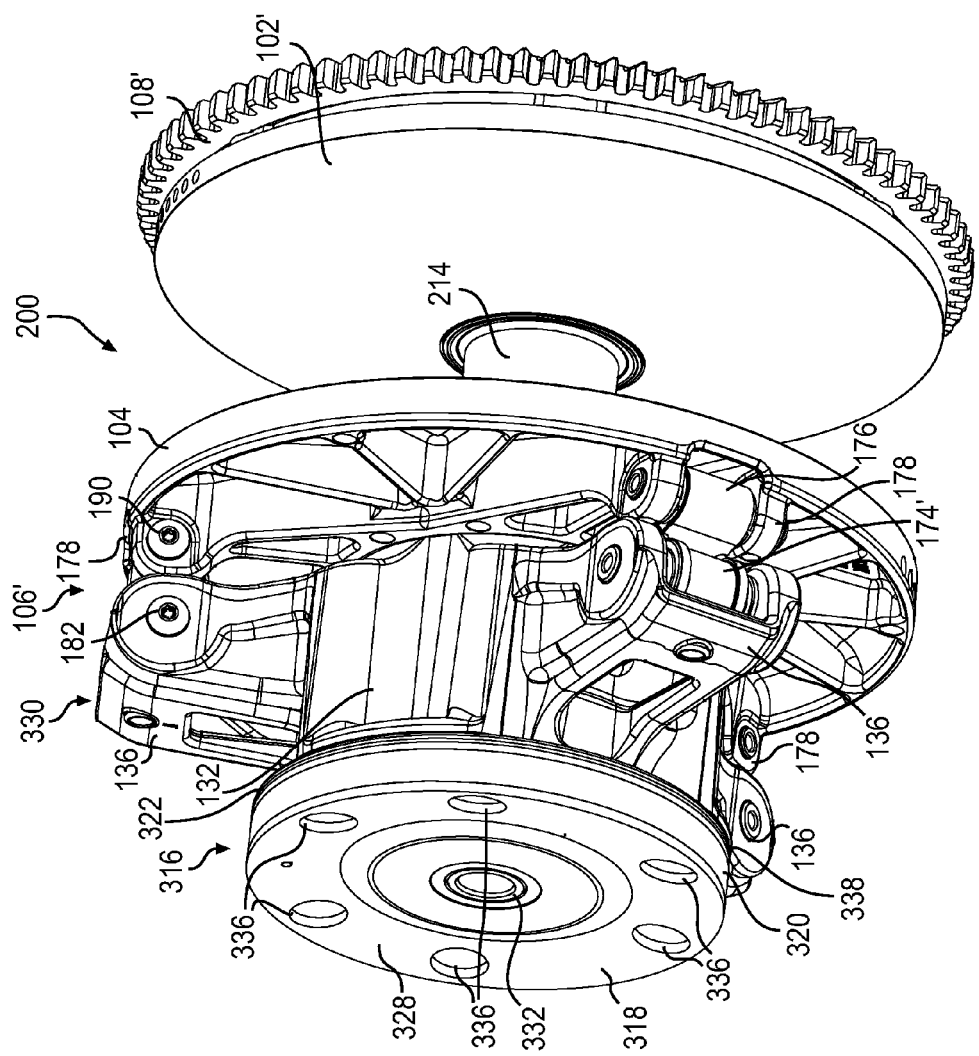
FIG. 17 is a perspective view, taken from a left side, of another alternative embodiment of a driving pulley of a CVT.
Figure 18:
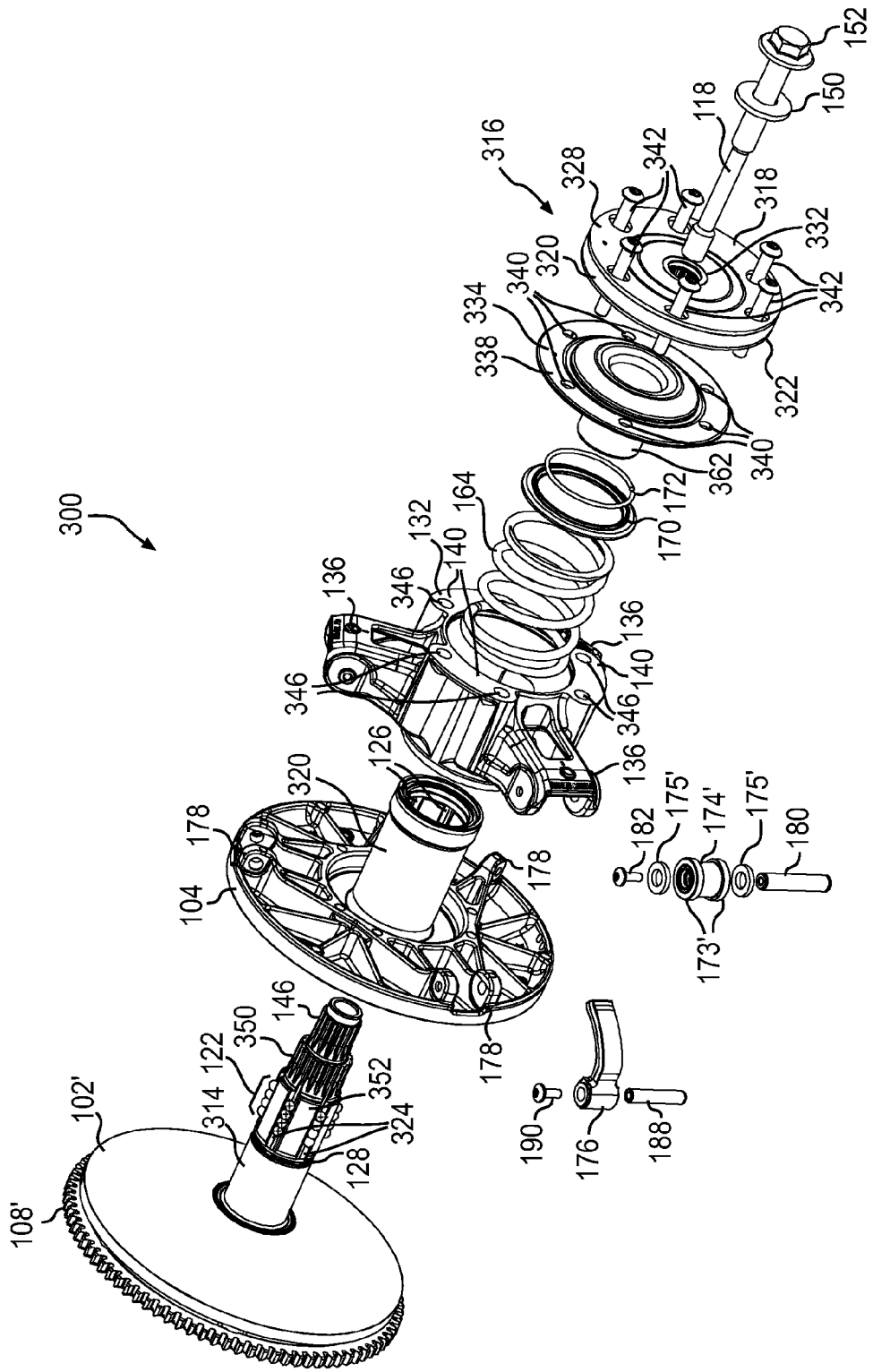
FIG. 18 is an exploded view of the driving pulley of FIG. 17, with some of the elements omitted for clarity.
Figure 19:
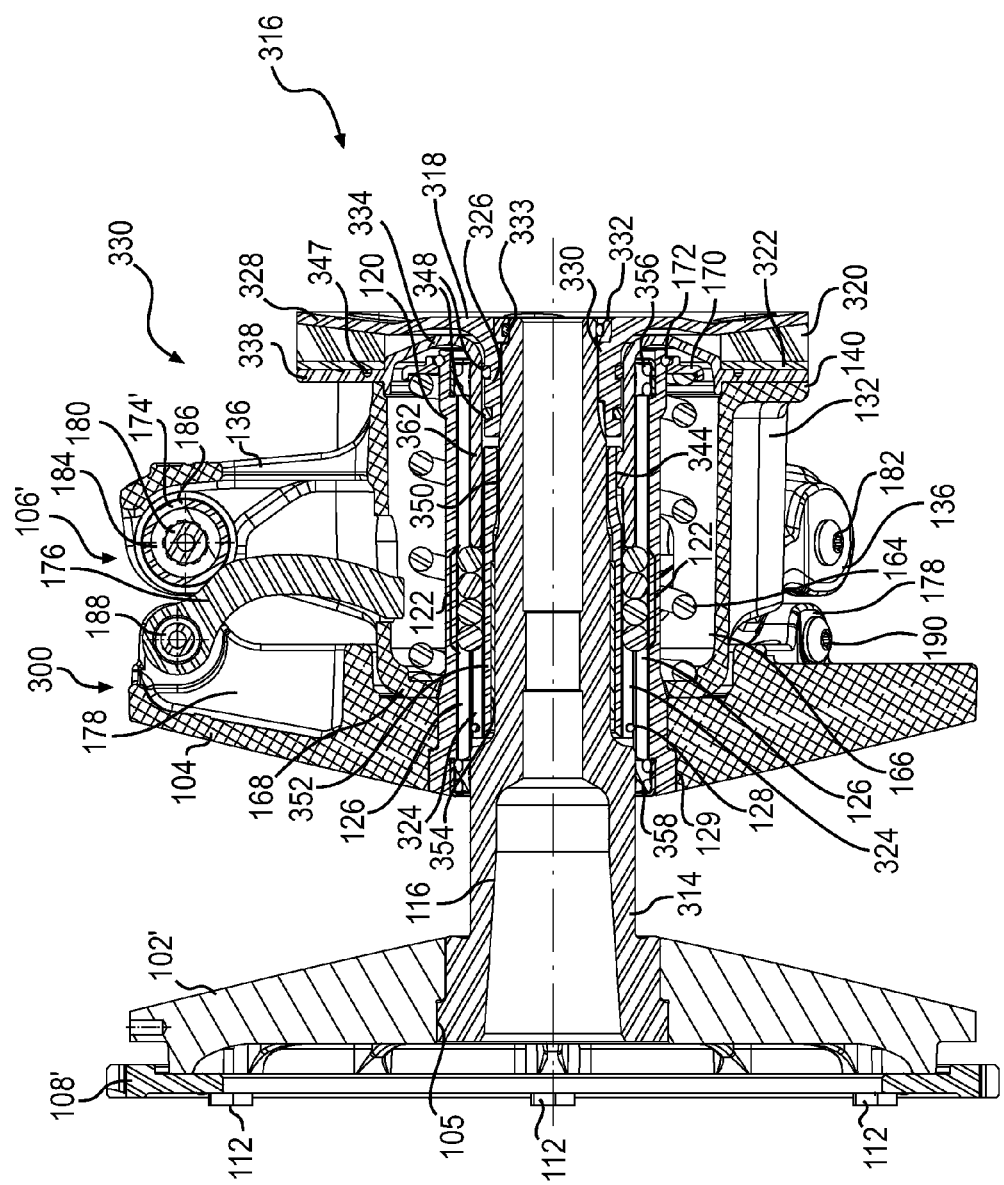
FIG. 19 is a cross-sectional view of the driving pulley of FIG. 17, with the driving pulley in an opened position.

Turning now to FIGS. 17 to 19, a driving pulley 300 will now be described. The driving pulley 300 is an alternative embodiment of the driving pulleys 100 and 100' described above and can be used in the CVT 40 described above instead of the driving pulley 100. For simplicity, elements of the driving pulley 300 that are similar to those of the driving pulley 100 and 100' have been labeled with the same reference numerals and will not be described again in detail.

The fixed sheave 102 is mounted to a shaft 314 in the same manner that the fixed sheave 102 is connected to the shaft 114 in the driving pulley 100.

A damper assembly 316 is connected to the end of the shaft 314. The damper assembly 316 includes a wheel 318, an elastomeric ring 320 and a inner ring 322. The wheel 318 includes a hub 326 and a flange 328. The elastomeric ring 320 is connected between the flange 328 of the wheel 318 and the inner ring 322. In one example, the wheel 318 and the inner ring 322 are inserted into a mold, rubber material that is used to form the elastomeric ring 320 is injected in the mold between the wheel 318 and the inner ring 322, the rubber material is then vulcanized inside the mold which also causes it to bond to both the wheel 318 and the inner ring 322. It is contemplated that the elastomeric ring 320 could be connected to the wheel 318 and the inner ring 322 in other ways. As can be seen in FIG. 19, the elastomeric ring 320 has a trapezoidal cross-section with its outer edge being thicker than its inner edge. It is contemplated that the elastomeric ring 320 could have other cross-sectional shapes, such as, for example, rectangular. In one example, the elastomeric material of the elastomeric ring 320 is vulcanized rubber, but it is contemplated that other types of elastomeric materials could be used.

The hub 326 has internal splines 330 (FIG. 19) that engage the external splines 146 (FIG. 18) on the end of the shaft 314 such that the wheel 318 is rotationally fixed relative to the shaft 314. A support ring 332 is disposed between the wheel 318 and the end of the shaft 314. An o-ring 333 seals the connection between the support ring 332 and the shaft 314. The wheel 318 is held axially between a tapered portion of the shaft 314 and a washer 150 (FIG. 18). The washer 150 is held between the head 152 of the bolt 118 and the end of the shaft 314. As a result, the wheel 316 is axially fixed relative to the shaft 314 and the fixed sheave 102.

A housing 330 is mounted on the end of the shaft 314 such that the movable sheave 104 is disposed axially between the housing 330 and the fixed sheave 102. The housing 330 includes a spider 132 and a cap 334. The cap 334 has a flange 338. Fasteners 342 (FIG. 18) are inserted through apertures 336 (FIG. 17) in the flange 328 of the wheel 318 and the elastomeric ring 320. The apertures 336 have a larger diameter than the fasteners 342 (including the head of the fasteners 342). The fasteners 342 are then inserted through apertures (not shown) in the inner ring 322, apertures 340 in the flange 338 of the cap 334 and apertures 346 (FIG. 18) in corresponding flanges 140 of the spider 132. As such, the fasteners 342 fasten the inner ring 322, the cap 334 and the spider 132 together and the inner ring 322, the cap 334 and the spider 132 are rotationally and axially fixed relative to each other. The elastomeric material used for the elastomeric ring 320 reduces the transmission of vibrations between the wheel 318 and the cap 334, as such there exists some slight relative motion between these elements when the driving pulley 300 is in use. O-rings 348 are disposed between a sleeve 362 of the cap 334 and the hub 326 of the wheel 318 to provide a seal in the space therebetween. As can be seen in FIG. 19, the inner ring 322 has an annular lip 347 received in a corresponding recess (not labeled) in the flange 338 of the cap 334.

The cap 334 has internal splines 344 (FIG. 19) that engage external splines 350 (best seen in FIG. 18) of a sleeve 352 so as to be rotationally fixed relative thereto. The sleeve 352 is disposed around the shaft 314 and is axially between the wheel 318 and the fixed sheave 102. A padding sleeve 354 (FIG. 19) is disposed radially between the sleeve 352 and the shaft 314 to reduce friction between the sleeve 352 and the shaft 314 thereby permit slight rotational movements of the sleeve 352 relative to the shaft 314 that result from the presence of the damper assembly 316.

A shaft 120 is disposed around the shaft 314 and the sleeve 352. Ball bearings 122 are disposed in axially extending grooves 324, 126 in the outer surface of the sleeve 352 and the inner surface of the shaft 120 respectively. The sleeve 352, the shaft 120 and the ball bearings 122 together form a ball spline assembly. The ball bearings 122 transfer torque from the sleeve 352 to the shaft 120 such that the shaft 120 rotates with the sleeve 352 while permitting axial movement of the shaft 120 relative to the sleeve 352. The shaft 120 is therefore rotationally fixed relative to the sleeve 352. A retaining ring 128 disposed on the sleeve 352 limits the movement of the ball bearings 122 inside the grooves 324, 126 in one direction and the sleeve 362 of the cap 334 limits the movement of the ball bearings 122 inside the grooves 324, 126 in the other direction. The movable sheave 104 is mounted on the shaft 120 as described above with respect to the driving pulley 100.

As can be seen in FIG. 19, a seal assembly 356 is disposed radially between the sleeve 362 of the cap 134 and the shaft 120 and axially between the ball bearings 122 and the end of the shaft 120 (the right end of the shaft 120 in FIG. 19). A seal assembly 358 is disposed radially between the shaft 114 and the shaft 120 and axially between the ball bearings 122 and the fixed sheave 102. The cavity defined axially between the seals 356 and 358 and radially between the sleeve 352, the sleeve 362 of the cap 334, and the shaft 120 is filled at least in part with lubricant. The ball bearings 122 are located inside this cavity.

A coil spring 164 is disposed in a cavity 166 defined between the shaft 120 and the housing 330 in the same manner as the spring 166 in the driving pulley 100 described above.

The driving pulley 300 has a centrifugal actuation system 106' that moves the movable sheave 104 and the shaft 120 toward the fixed sheave 102 as the speed of rotation of the driving pulley increases. The centrifugal actuation system 106' is essentially the same as the centrifugal actuation system 106 described above. In the centrifugal actuation system 106', the ends of the rollers 174' are provided with shoulders 173' and washers 175' are provided between the ends of the rollers 174' and the brackets 178.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A driving pulley for a continuously variable transmission comprising:
   a first shaft having a plurality of axially extending first grooves;
   a fixed sheave disposed on the first shaft, the fixed sheave being axially and rotationally fixed relative to the first shaft;
   a second shaft disposed around the first shaft and having a plurality of axially extending second grooves, the first and second grooves being equal in number,
   at least some of the plurality of second grooves being angularly offset from corresponding first grooves of the plurality of first grooves;
   a plurality of ball bearings disposed radially between the first and the second shafts, each one of the plurality of ball bearings being disposed in one of the plurality of first grooves and in a corresponding one of the plurality of second grooves;
a movable sheave disposed on the second shaft, the movable sheave being axially and rotationally fixed relative to the second shaft, the movable sheave and the second shaft being movable axially relative to the fixed sheave and the first shaft, the movable sheave and the second shaft being rotationally fixed relative to the fixed sheave and the first shaft by the plurality of ball bearings;
at least one first seal disposed radially between the first and the second shafts and axially between the plurality of ball bearings and the fixed sheave;
at least one second seal disposed radially between the first and the second shafts and axially between the plurality of ball bearings and an end of the second shaft, the movable sheave being disposed axially between the end of the second shaft and the fixed sheave;
a cavity defined axially between the at least one first seal and the at least one second seal and radially between the first and the second shafts, the plurality of ball bearings being disposed in the cavity, the cavity being adapted to be filled at least in part with lubricant;
a housing disposed on the first shaft, the housing being axially and rotationally fixed relative to the first shaft, the movable sheave being disposed axially between the housing and the fixed sheave;
at least one weighted arm being pivotally connected to one of the movable sheave and the housing,
the at least one weighted arm pivoting away from the first shaft and pushing against an other one of the movable sheave and the housing as a speed of rotation of the driving pulley increases, thereby moving the movable sheave and the second shaft axially toward the fixed sheave; and
a spring biasing the movable sheave and the second shaft axially away from the fixed sheave.

2. The driving pulley of claim 1, wherein:
one of the housing and the first shaft has at least one key;
an other of the housing and the first shaft has at least one keyway; and
the at least one key is received in the at least one keyway.

3. The driving pulley of claim 2, wherein:
the first shaft has the at least one key;
the housing has the at least one keyway;
the at least one key is a plurality of keys forming external splines; and
the at least one keyway is a plurality of keyways forming internal splines.

4. The driving pulley of claim 1, further comprising at least one roller connected to the other one of the movable sheave and the housing, the at least one roller being aligned with the at least one weighted arm;
wherein the at least one weighted arm pushes against the roller as the speed of rotation of the driving pulley increases.

5. The driving pulley of claim 4, wherein the at least one weighted arm is pivotally connected to the movable sheave and the at least one roller is connected to the housing.

6. The driving pulley of claim 1, wherein at least two of the plurality of ball bearings are disposed in each set of corresponding first and second grooves.

7. The driving pulley of claim 1, wherein:
half of the second grooves of the plurality of second grooves are angularly offset from the corresponding first grooves in a clockwise direction; and
a remaining half of the second grooves of the plurality of second grooves are angularly offset from the corresponding first grooves in a counter-clockwise direction.

8. The driving pulley of claim 1, wherein;
the first grooves of the plurality of first grooves are equally spaced from one another; and
the second grooves of the plurality of second grooves are unequally spaced from one another.

9. The driving pulley of claim 1, wherein:
the plurality of ball bearings moves toward the fixed sheave as the movable sheave and the second shaft move axially toward the fixed sheave; and
the plurality of ball bearings moves away from the fixed sheave as the movable sheave and the second shaft move axially away from the fixed sheave.

10. The driving pulley of claim 1, wherein the spring is compressed as the movable sheave and the second shaft move axially toward the fixed sheave.

11. The driving pulley of claim 10, wherein the spring is disposed radially between the housing and the second shaft.

12. A continuously variable transmission comprising:
the driving pulley of claim 1;
a driven pulley having a fixed sheave and a movable sheave; and
a belt disposed between the fixed and movable sheaves of the driving pulley and between the fixed and movable sheaves of the driven pulley, the belt transmitting torque from the driving pulley to the driven pulley.

13. A vehicle comprising:
an engine;
the continuously variable transmission of claim 12, the driving pulley being operatively connected to the engine and being driven by the engine; and
a propulsion element operatively connected to the driven pulley and propelling the vehicle.

14. The vehicle of claim 13, wherein the propulsion element is an endless drive track and the vehicle is a snowmobile.

15. The driving pulley of claim 1, further comprising lubricant disposed in the cavity and filling the cavity at least in part.

16. The driving pulley of claim 1, wherein the housing includes an inner sleeve disposed radially between the first and second shafts.

17. The driving pulley of claim 16, wherein the at least one second seal is disposed radially between the inner sleeve and the second shaft.

18. The driving pulley of claim 17, wherein the cavity is defined radially between:
the second shaft, and
the first shaft and the inner sleeve.

19. The driving pulley of claim 16, wherein the plurality of ball bearings is disposed axially between the at least one first seal and the inner sleeve.

20. A driving pulley for a continuously variable transmission comprising:
a first shaft having a plurality of axially extending first grooves;
a fixed sheave disposed on the first shaft, the fixed sheave being axially and rotationally fixed relative to the first shaft;
a second shaft disposed around the first shaft and having a plurality of axially extending second grooves;
a plurality of ball bearings disposed radially between the first and the second shafts, each one of the plurality of ball bearings being disposed in one of the plurality of first grooves and in a corresponding one of the plurality of second grooves;
a movable sheave disposed on the second shaft, the movable sheave being axially and rotationally fixed relative to the second shaft, the movable sheave and the second shaft being movable axially relative to the fixed sheave and the first shaft, the movable sheave and the second shaft being rotationally fixed relative to the fixed sheave and the first shaft by the plurality of ball bearings;
at least one first seal disposed radially between the first and the second shafts and axially between the plurality of ball bearings and the fixed sheave;
at least one second seal disposed radially between the first and the second shafts and axially between the plurality of ball bearings and an end of the second shaft, the movable sheave being disposed axially between the end of the second shaft and the fixed sheave;
a cavity defined axially between the at least one first seal and the at least one second seal and radially between the first and the second shafts, the plurality of ball bearings being disposed in the cavity, the cavity being filled at least in part with lubricant,
at least one of the plurality of first grooves and the plurality of second grooves defining gaps between the ball bearings, the first shaft and the second shaft, the gaps permitting the lubricant to flow around the plurality of ball bearings as the plurality of ball bearings rolls in the plurality of first grooves and the plurality of second grooves;
a housing disposed on the first shaft, the housing being axially and rotationally fixed relative to the first shaft, the movable sheave being disposed axially between the housing and the fixed sheave;
at least one weighted arm being pivotally connected to one of the movable sheave and the housing,
the at least one weighted arm pivoting away from the first shaft and pushing against an other one of the movable sheave and the housing as a speed of rotation of the driving pulley increases, thereby moving the movable sheave and the second shaft axially toward the fixed sheave; and
a spring biasing the movable sheave and the second shaft axially away from the fixed sheave.

21. The driving pulley of claim 20, wherein edges of the plurality of second grooves are flared to define the gaps.

22. The driving pulley of claim 20, wherein the lubricant is grease.

23. The driving pulley of claim 20, wherein at least some of the plurality of second grooves are angularly offset from corresponding first grooves of the plurality of first grooves.

24. The driving pulley of claim 20, wherein the spring is compressed as the movable sheave and the second shaft move axially toward the fixed sheave.

25. A continuously variable transmission comprising:
the driving pulley of claim 20;
a driven pulley having a fixed sheave and a movable sheave; and
a belt disposed between the fixed and movable sheaves of the driving pulley and between the fixed and movable sheaves of the driven pulley, the belt transmitting torque from the driving pulley to the driven pulley.

* * * * *